US012104418B1

(12) United States Patent
Krebs et al.

(10) Patent No.: US 12,104,418 B1
(45) Date of Patent: Oct. 1, 2024

(54) WINDOW OR DOOR HAVING A CARRIAGE ARRANGEMENT WITH ROLLER BEARING-GUIDED FORCE DISSIPATION IN THE DISPLACEMENT DIRECTION

(71) Applicant: Roto Frank Fenster- und Türtechnologie GmbH, Leinfelden-Echterdingen (DE)

(72) Inventors: Martin Krebs, St. Johann (DE); Winfried Reich, Berglen (DE); Choongeun Park, Stuttgart (DE); Tobias Schaefer, Sindelfingen (DE); Erkan Balci, Filderstadt (DE); Michael Beutel, Waldenbuch (DE)

(73) Assignee: Roto Frank Fenster- und Türtechnologie GmbH, Leinfelden-Echterdingen (DE)

(*) Notice: Subject to any disclaimer, the term of this patent is extended or adjusted under 35 U.S.C. 154(b) by 0 days.

(21) Appl. No.: 18/168,507

(22) Filed: Feb. 13, 2023

Related U.S. Application Data

(63) Continuation of application No. PCT/EP2021/070830, filed on Jul. 26, 2021.

(30) Foreign Application Priority Data

Aug. 17, 2020 (DE) .................... 10 2020 210 443 U

(51) Int. Cl.
*E05D 15/10* (2006.01)
*E06B 7/16* (2006.01)

(52) U.S. Cl.
CPC ................ *E05D 15/10* (2013.01); *E06B 7/16* (2013.01); *E05D 2015/1039* (2013.01); *E05Y 2900/132* (2013.01); *E05Y 2900/148* (2013.01)

(58) Field of Classification Search
CPC ............ E05D 2015/1039; E05D 15/10; E05D 15/0665; E06B 7/16; E05Y 2900/132; E05Y 2900/148
See application file for complete search history.

(56) References Cited

U.S. PATENT DOCUMENTS 3,660,936 A * 5/1972 Bryson .................. E05D 15/10 49/449
5,012,611 A * 5/1991 Hsu .......................... E06B 7/18 49/225

(Continued)

FOREIGN PATENT DOCUMENTS

CN 104863460 A 8/2015
CN 105909155 B 6/2018

(Continued)

*Primary Examiner* — Justin B Rephann
(74) *Attorney, Agent, or Firm* — Orbit IP, LLP

(57) ABSTRACT

A carriage arrangement has a driving bar arrangement and a carriage. The carriage has a roller part with a plurality of running rollers. The roller part is displaceable transversely to the longitudinal extent of the carriage with respect to a wing part which can be mounted immovably on a wing. A driving bar of the driving bar arrangement has a control projection which engages in a control slot which is formed obliquely to the longitudinal extent of the carriage. To guide the roller part on the wing part is provided a first roller bearing guide which extends transversely to the longitudinal extent of the carriage. The first roller bearing guide has rolling bodies which are supported both on the wing and roller part so forces acting in the direction of the longitudinal extent of the carriage are channelled away from the wing part into the roller part with low friction.

19 Claims, 22 Drawing Sheets

(56) References Cited

U.S. PATENT DOCUMENTS

| | | | | |
|---|---|---|---|---|
| 7,124,538 | B1 * | 10/2006 | Kline | E06B 3/4618 49/304 |
| 10,077,594 | B2 * | 9/2018 | Fingerle | E05D 15/10 |
| 11,085,216 | B2 | 8/2021 | Reich | |
| 11,098,513 | B2 * | 8/2021 | Liu | E06B 7/16 |
| 11,428,033 | B2 * | 8/2022 | Beutel | E05D 15/0691 |
| 2009/0038228 | A1 * | 2/2009 | Lee | E05D 15/10 49/506 |
| 2013/0269259 | A1 | 10/2013 | Hendren et al. | |
| 2019/0071910 | A1 * | 3/2019 | Alban | E05D 15/0665 |
| 2019/0292828 | A1 | 9/2019 | Liu et al. | |
| 2019/0345749 | A1 * | 11/2019 | Reich | E05D 15/10 |

FOREIGN PATENT DOCUMENTS

| | | | |
|---|---|---|---|
| CN | 110088420 | A | 8/2019 |
| CN | 110242164 | A | 9/2019 |
| DE | 11 2011 103 609 | T5 | 8/2013 |
| DE | 10 2014 220 837 | B3 | 1/2016 |
| DE | 10 2016 121 709 | A1 | 5/2018 |
| DE | 10 2016 225 385 | A1 | 6/2018 |
| DE | 10 2017 217 346 | A1 | 3/2019 |
| EP | 3 187 678 | A1 | 7/2017 |
| EP | 3 321 459 | A1 | 5/2018 |
| EP | 3 327 233 | A1 | 5/2018 |
| EP | 3 808 929 | A1 | 4/2021 |
| JP | 2003-184410 | A | 7/2003 |
| KR | 10-2019-0002138 | A | 1/2019 |
| WO | 2012/057539 | A1 | 5/2012 |
| WO | 2012/093382 | A1 | 7/2012 |
| WO | 2016/058756 | A1 | 4/2016 |
| WO | 2017/206273 | A1 | 12/2017 |
| WO | 2018/114337 | A1 | 6/2018 |

* cited by examiner

WINDOW OR DOOR HAVING A CARRIAGE ARRANGEMENT WITH ROLLER BEARING-GUIDED FORCE DISSIPATION IN THE DISPLACEMENT DIRECTION

CROSS-REFERENCE TO RELATED APPLICATIONS

This continuation application claims priority to PCT/EP2021/070830 filed on Jul. 26, 2021 which has published as WO 2022/037903 A1 and also the German application number 10 2020 210 443.3 filed on Aug. 17, 2020, the entire contents of which are fully incorporated herein with these references.

FIELD OF THE INVENTION

The invention relates to a carriage arrangement according to the preamble of claim 1. The invention further relates to a window or a door with such a carriage arrangement.

BACKGROUND OF THE INVENTION

It is known to provide a carriage arrangement in order to be able to move a sash of a window or of a door not only in its displacement direction but also transversely thereto. The transverse movement here serves to move the sash out of its sealing abutment or into its sealing abutment on the fixed frame.

EP 3 187 678 A1 discloses the displacement of door sashes transversely to the main plane of a fixed frame of a door, i.e., perpendicularly to the door plane. Rollers or ball rollers are used to displace the door sashes.

From EP 3 327 233 A1 and JP 2003 184 410 A the use of fittings with a ball raceway has become known.

EP 3 321 459 A1 discloses a rocker having rollers that is to be mounted with a roller bearing in order to achieve an oscillating mounting of rollers on a carriage, said mounting being smooth-running and high load dissipating.

It has become known from DE 11 2011 103 609 T5 to provide two guides on a carriage that are spaced apart in the running direction. The guides have cylindrical bolts which are completely enclosed in each case by a hole in the roller part, there being no use of roller bearings.

WO 2017/206273 A1 discloses a generic carriage with two roller bearings spaced apart in the running direction for offloading the weight of the sash. Forces in the longitudinal direction of the carriage are dissipated by a tongue-and-groove guide with sliding friction.

Since sashes are constantly getting bigger and better insulated, the weight of the sashes is also increasing. There is therefore a need to provide a carriage arrangement that is both sturdy enough to offload the weight of a heavy sash and is smooth-running enough to allow a user to move the heavy sash easily.

SUMMARY OF THE INVENTION

It is therefore the object of the invention to provide a load-bearing carriage arrangement which permits smooth-running movement of the sash by a user. It is a further object of the invention to provide a window or door with such a carriage arrangement.

This object is achieved according to the invention by a carriage arrangement having the characterizing features of claim 1 or by a window or a door according to claim 15. The dependent claims reflect preferred developments.

The object according to the invention is thus achieved by a carriage arrangement with a driving bar arrangement and a carriage. The driving bar arrangement has a driving bar. The carriage has a sash part that can be immovably mounted on the sash and a roller part with a plurality of rollers for moving the roller part in the main plane of a fixed frame, wherein the roller part is movable transversely to the main plane relative to the sash part. The main plane of the fixed frame is a vertical plane that intersects a running rail of the fixed frame. To produce this transverse movement, a control projection is arranged or formed on the driving bar and engages in an at least partially oblique control slot in the roller part. An oblique design of the control slot is here understood to mean a design of the control slot having an angle of more than 0° and less than 90° to the main plane. The carriage furthermore has a first roller bearing guide for guiding this transverse movement. The first roller bearing guide is designed to offload onto the roller part forces acting in the main plane. The first roller bearing guide enables the user to operate the sash significantly more comfortably, while at the same time preventing the roller part from jamming on the sash part during the transverse movement.

The first roller bearing guide preferably extends perpendicularly to the main plane. The first roller bearing guide can have a roller bearing bed on the sash part and a roller bearing bed on the roller part. The roller bearing beds are preferably fixed immovably to the sash part or roller part. Rolling bodies of the first roller bearing guide are preferably supported in the direction of the longitudinal axis of the roller part on both roller bearing beds in order to offload forces in the direction of the longitudinal axis from the sash part onto the roller part or vice versa.

In addition to the movement of the roller part in the transverse direction, an actuation of the driving bar and thus a displacement of the control projection in the control slot also causes a force on the roller part in the longitudinal direction. This force in the longitudinal direction can be dissipated with low friction by the first roller bearing guide.

As mentioned above, the running rail runs in the main plane of the fixed frame. The rollers of the roller part are designed to run on the running rail and intersect the main plane. The longitudinal axis of the roller part also runs in the main plane. The displacement direction of the sash checked by the fixed frame extends in particular parallel to the main plane. The transverse movement for the fixed frame checking the sash or for pressing the sash against the fixed frame preferably runs perpendicularly to the main plane.

The first roller bearing guide can have a bearing part and a support rail. The support rail can abut a convexly curved surface of a concavely curved support surface of the bearing part with rolling bodies arranged thereon. As a result, forces in the main plane can be transferred from the sash part to the roller part in a structurally particularly simple manner.

The bearing part can be designed with a ball raceway with balls guided therein as rolling bodies.

Alternatively, the bearing part can be designed as a linear ball bearing, where the rolling bodies are held in a rolling body cage.

The bearing part is structurally further simplified when the support surface in cross-section, i.e., in the main plane, is in the form of a circular arc, in particular a semicircle.

In order to avoid a pivoting of the bearing part about its longitudinal axis, the bearing part can be held by a form fit on the roller part or sash part.

Further preferably, the support rail has non-fixed free ends when viewed in its longitudinal direction. The support rail can then be fastened by a single central fastening means, for example a screw.

Furthermore, the support rail can also be inserted completely unfastened into a recess in the carriage.

Alternatively or in addition to the bearing part described, the first roller bearing guide can have a ball bearing extending in the longitudinal direction of the first roller bearing guide. The rolling bodies in the form of balls of the ball bearing can here be guided in roller bearing beds in the form of ball bearing beds. The ball bearing beds can in each case have a groove in which the balls are guided.

In a further preferred embodiment of the invention, the first roller bearing guide has a needle bearing, so that the high weight forces can be offloaded particularly reliably.

In a particularly preferred embodiment of the invention, the first roller bearing guide has a roller bearing bed, in particular in the form of a needle bearing bed, the surface of which is oriented at an angle between 0° and 180, in particular at an angle between 10° and 100°, in relation to the direction of the longitudinal axis of the roller part. As a result, the forces occurring in the displacement direction can be offloaded particularly reliably onto the roller part.

Further preferably, the carriage has a second roller bearing guide spaced apart from the first roller bearing guide in the direction of the longitudinal axis of the roller part in order to offload forces in a displacement direction particularly reliably from the sash part onto the roller part. In particular, the second roller bearing guide particularly reliably prevents jamming of the roller part on the sash part.

The first roller bearing guide can be designed as a fixed bearing and the second roller bearing guide as a floating bearing. Alternatively, the first roller bearing guide can be designed as a floating bearing and the second roller bearing guide as a fixed bearing. As a result, tolerances in the manufacture of the carriage can be compensated.

The first roller bearing guide and/or the second roller bearing guide can be designed in the form of a linear ball bearing. Alternatively or additionally, the first roller bearing guide and/or the second roller bearing guide can be designed in a C-shape.

Preferably, the control projection is arranged between the first and second roller bearing guide.

The second roller bearing guide can be designed identical to the first roller bearing guide in order to further simplify the design of the carriage.

The second roller bearing guide preferably extends perpendicularly to the main plane. The second roller bearing guide can have a roller bearing bed on the sash part and a roller bearing bed on the roller part. The roller bearing beds are preferably fixed immovably to the sash part or roller part. Rolling bodies of the second roller bearing guide are preferably supported in the direction of the longitudinal axis of the roller part on both roller bearing beds in order to offload forces in the direction of the longitudinal axis from the sash part into the roller part.

The roller part can be inserted at least partially into the sash part by means of a dovetail-shaped form-fit 43. In this case, the roller part can be inserted into the sash part transversely, in particular perpendicularly, to the main plane in order to mount the roller part on the sash part.

In a further preferred embodiment of the invention, the sash part is integrally formed. The sash part can have a straight guide slot through which the control projection is guided.

The control projection can have a plain bearing for the oblique guide slot in the roller part. Alternatively, the control projection can have a roller-bearing-guided roller for guiding the control projection in the oblique guide slot.

The control projection can have a plain bearing for the straight guide slot in the sash part. Alternatively, the control projection can have a roller-bearing-guided roller for guiding the control projection in the straight guide slot.

The driving bar arrangement can be fastened to the carriage. This considerably simplifies the installation of the carriage arrangement on the sash for the window fitter. Furthermore, this prevents dirt from getting into the carriage arrangement during the installation of the carriage arrangement on the sash.

A holding means can be provided for fastening the driving bar arrangement to the carriage. In particular, a clip, a rivet, a screw and/or a metal plate provided with a hook can be provided as holding means. For fastening the driving bar arrangement to the carriage, the carriage arrangement preferably has two holding means, in particular two clips, two rivets, two screws and/or two metal plates in each case provided with a hook.

The object according to the invention is further achieved by a window or a door with a carriage arrangement described here.

Further advantages of the invention can be found in the description and the drawings. Likewise, according to the invention, the aforementioned features and those which are to be explained below can each be used individually or together in any desired combinations. The embodiments shown and described are not to be understood as an exhaustive list, but, rather, have an exemplary character for the description of the invention.

DETAILED DESCRIPTION OF THE PREFERRED EMBODIMENTS

Figure 1A:
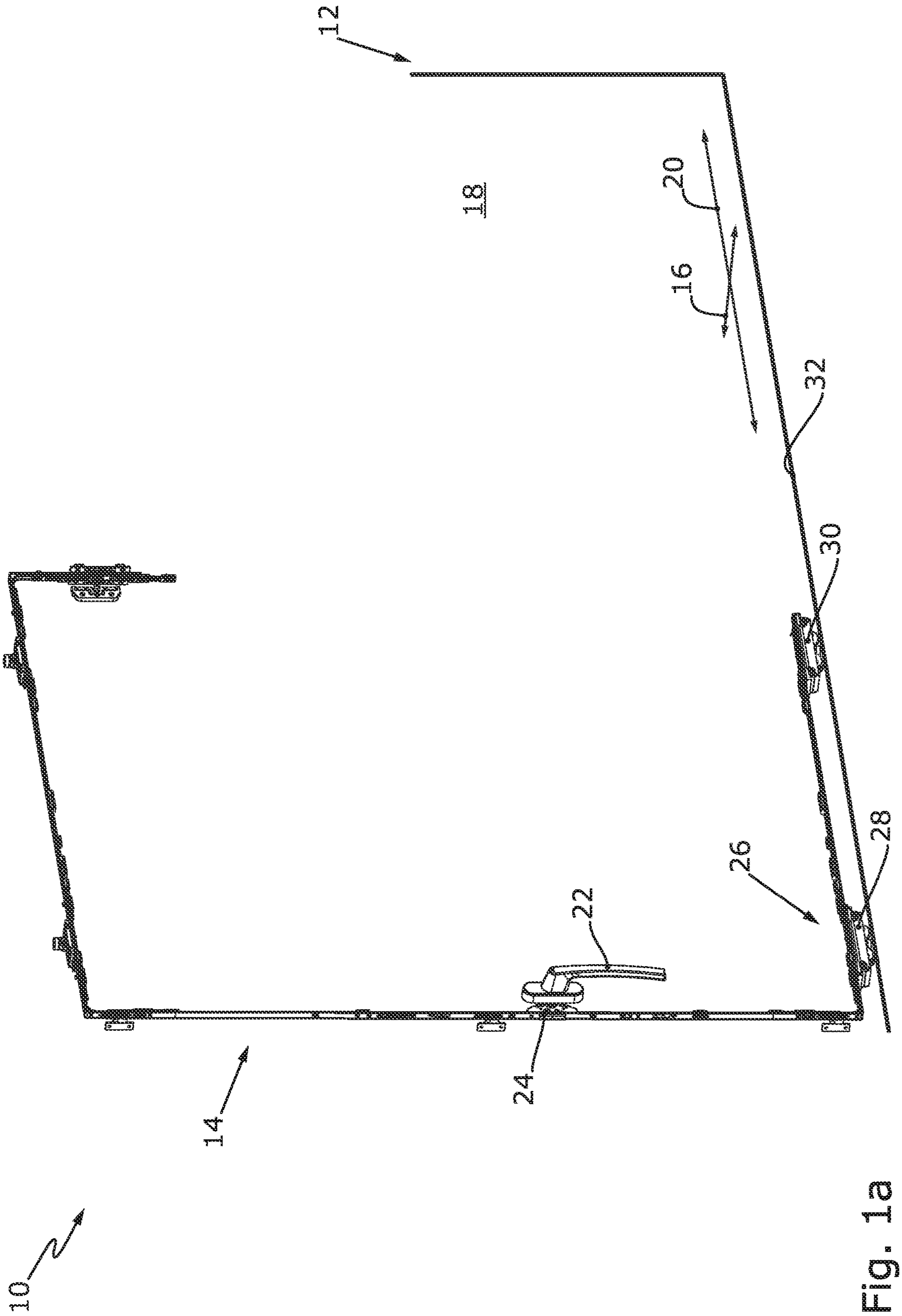
FIG. 1*a* shows an isometric view of a door with schematically illustrated fixed frame and fittings of a sash of the door, the fittings comprising two carriage arrangements.

FIG. 1*a* shows a door 10 with a schematically partially indicated fixed frame 12 and at least one sash 14. The sash 14 is indicated in FIG. 1*a* by fittings. The sash 14 can be moved in a transverse direction 16 from the main plane 18 of the fixed frame 12 and parallel to the main plane 18 in the displacement direction 20.

The movement of the sash 14 in the displacement direction 20 is not positively controlled, but a user can move the sash 14 in the parked state by directly displacing the sash 14. In contrast, sash movement in the transverse direction 16 is positively controlled. For this purpose, the user can operate a handle 22 whose pivoting is translated by a mechanism 24 into a linear movement of a driving bar arrangement 26. The driving bar arrangement operates a plurality of carriages 28, 30, which are arranged at the bottom of the sash 14, in order to transfer the weight of the sash 14 onto a running rail 32. The running rail 32 is part of the fixed frame 12. The carriages 28, 30 are preferably of identical design.

Figure 1B:
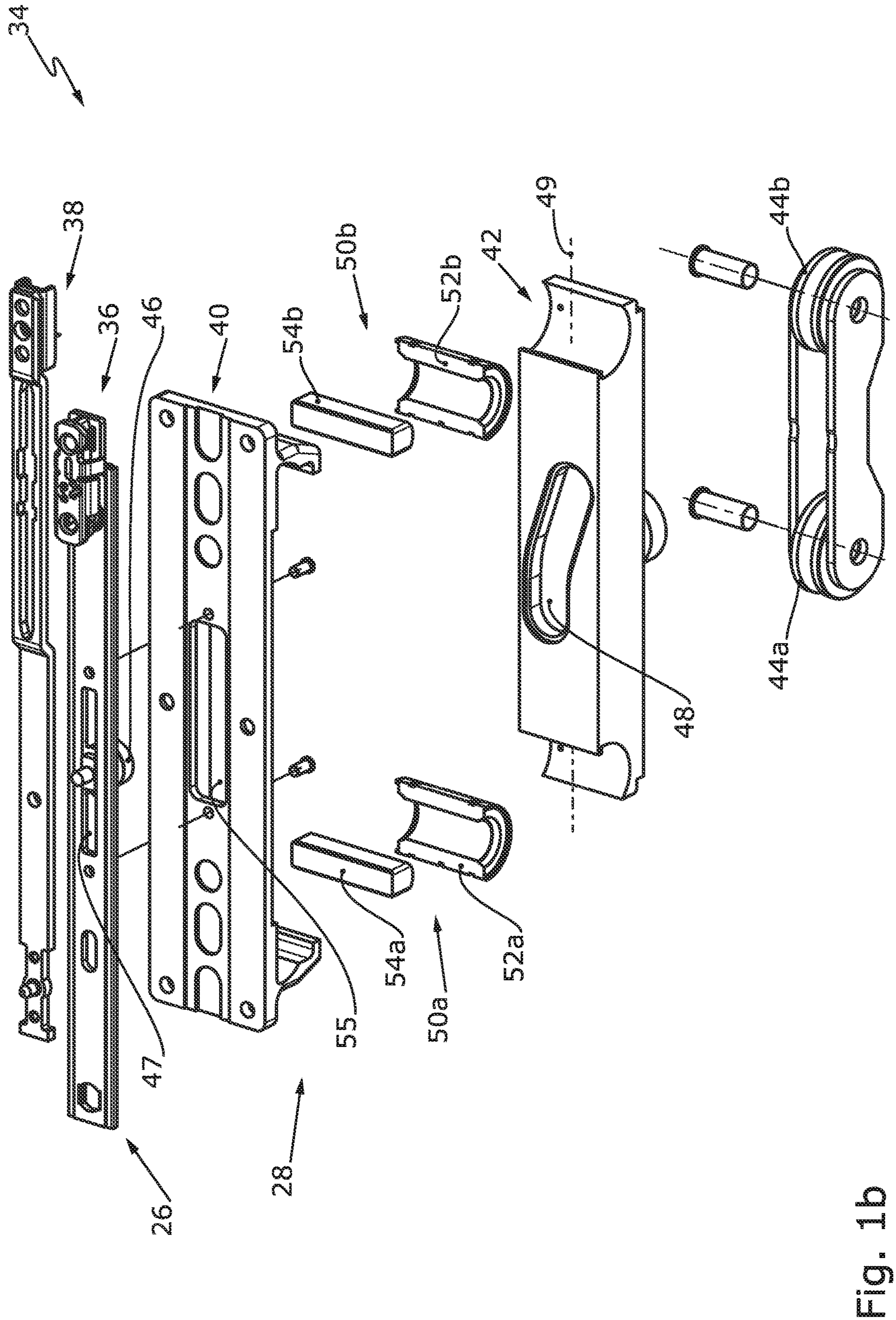
FIG. 1*b* shows an exploded view of one of the carriage arrangements.

FIG. 1*b* shows an exemplary embodiment of a carriage arrangement 34. The carriage arrangement 34 comprises the driving bar arrangement 26 and the carriage 28. The driving bar arrangement 26 has a lipped rail 36 that is fixedly mountable on the sash 14 (see FIG. 1*a*) and a driving bar 38 movable relative to the lipped rail. The carriage 28 has a sash part 40 that is fixedly mountable on the sash 14 (see FIG. 1*a*) and a roller part 42 with multiple rollers 44*a*, 44*b*. The roller part 42 is movable relative to the sash part 40 in the transverse direction 16 (see FIG. 1*a*). This movement is mediated by the driving bar 38 via a control projection 46. The control projection 46 can here project through a slot 47 in the lipped rail 36. The control projection 46 engages in a control slot 48. The control slot 48 is at least sectionally oblique to the longitudinal axis 49 of the roller part 42 or oblique to the main plane 18 (see FIG. 1*a*).

For guiding the roller part 42 in the transverse direction 16 (see FIG. 1*a*), i.e., transversely, in particular perpendicularly, to the longitudinal axis 49, the sash part 40 is supported on the roller part 42 by a first roller bearing guide 50*a* and a second roller bearing guide 50*b*. The roller bearing guides each comprise a bearing part 52*a*, 52*b*, in each of which a support rail 54*a*, 54*b* is guided.

When generating the force for the transverse displacement of the roller part, the control projection 46 is preferably supported in a straight guide slot 55 in the sash part 40. The guide slot 55 extends in the direction of the main plane 18 (see FIG. 1*a*) or, depending on the parked position of the sash 14 (see FIG. 1*a*) from the fixed frame 12 (see FIG. 1*a*), parallel to the main plane 18 (see FIG. 1*a*).

Figure 1C:
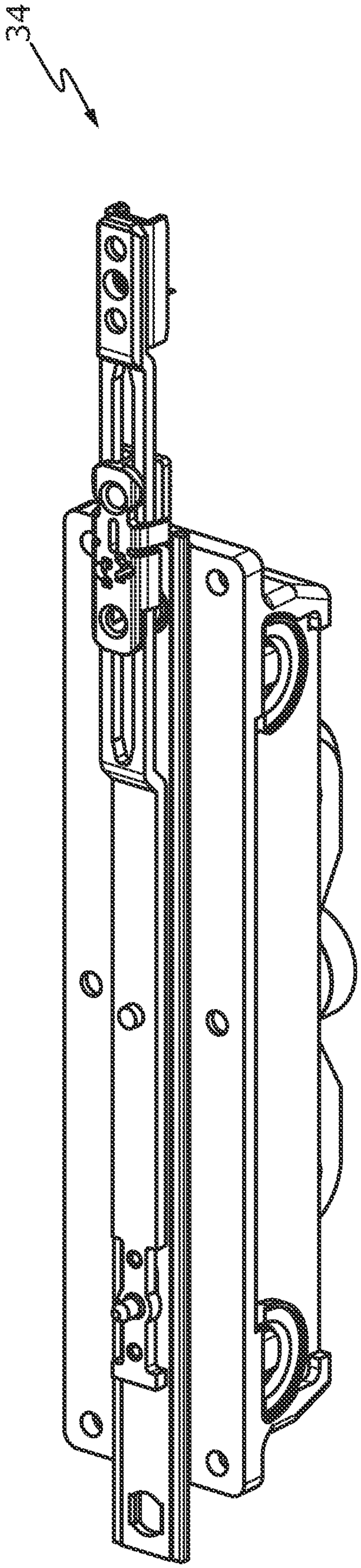
FIG. 1*c* shows an isometric view of a part of the carriage arrangement from FIG. 1*b* in the mounted state.

FIG. 1*c* shows the carriage arrangement 34 in the mounted state.

Figure 1E:
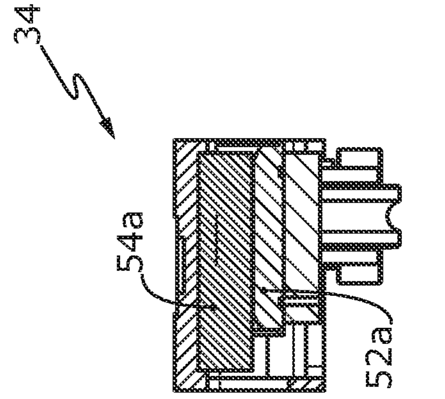
FIG. 1*e* shows the carriage arrangement from FIG. 1*d* in cross-section in the region of the first roller bearing guide, the first roller bearing guide having a bearing part.
Figure 1D:
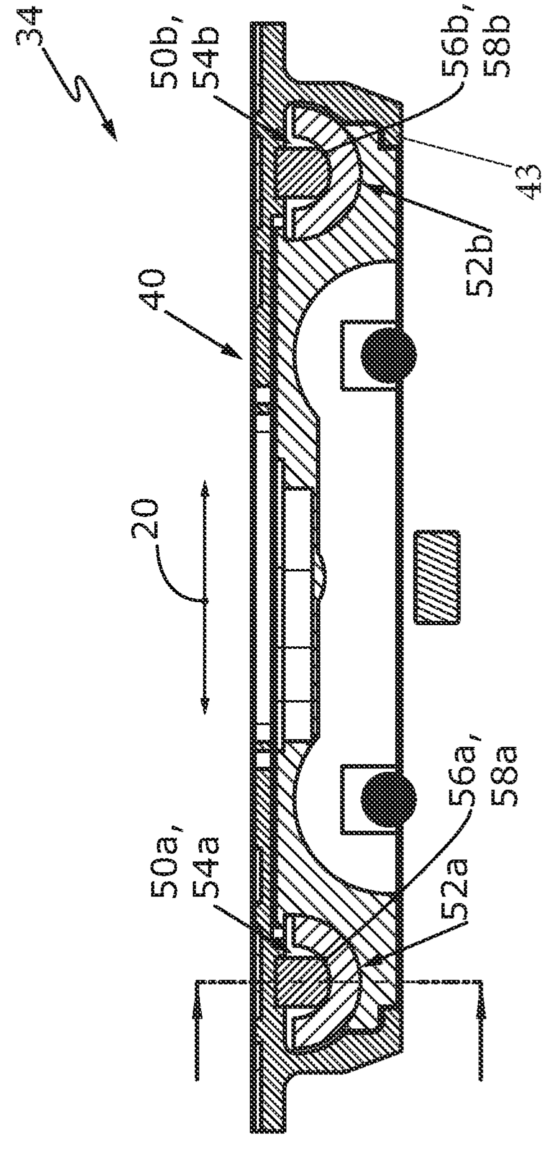
FIG. 1*d* shows the carriage arrangement from FIG. 1*c* in a longitudinal section with a first roller bearing guide.
Figure 1F:
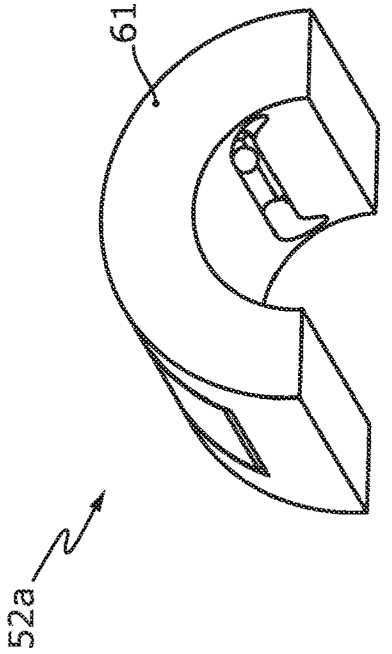
FIG. 1*f* shows an isometric view of the bearing part from FIG. 1*e*, wherein the bearing part has ball raceways.
Figure 1G:
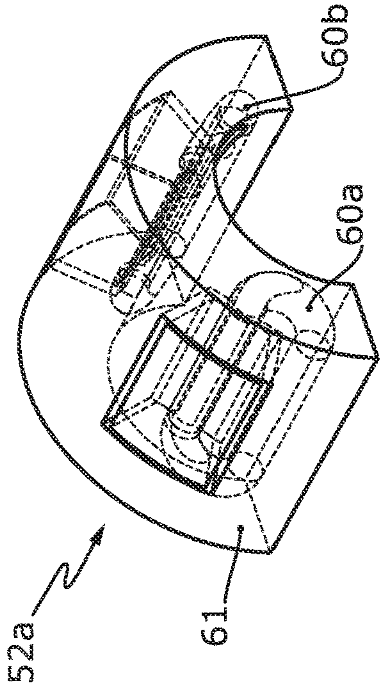
FIG. 1*g* shows a further isometric view of the bearing part from FIG. 1*f* with grooves in the ball raceways which are visible in dashed lines.
Figure 1H:
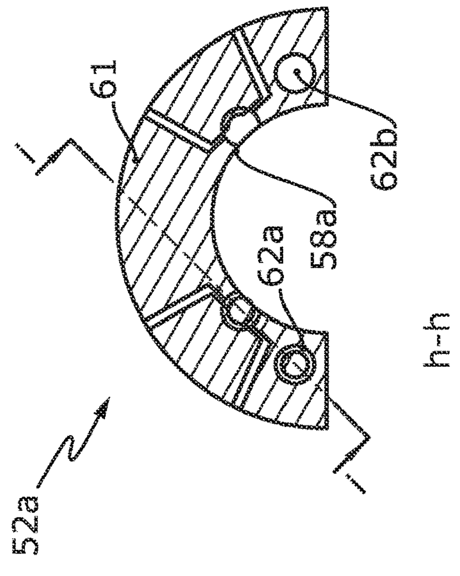
FIG. 1*h* shows the bearing part from FIG. 1*g* in cross-section or in a view of the h-h sectional plane from FIG. 1*i*.
Figure 1I:
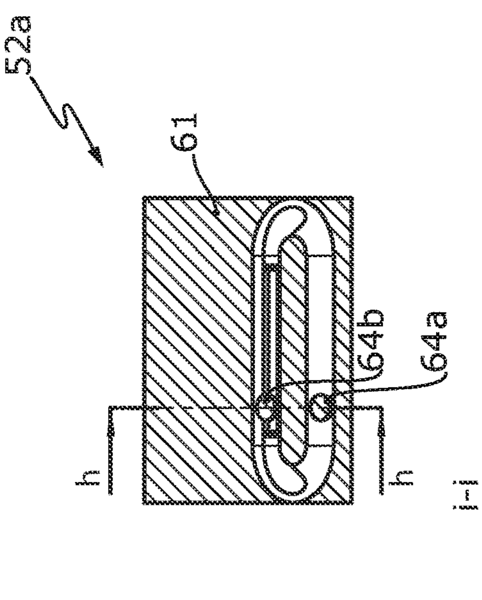
FIG. 1*i* shows the bearing part according to FIG. 1*h* in a view of the i-i sectional plane from FIG. 1*h*.

FIG. 1*d* shows a longitudinal section through the carriage arrangement 34. It can be seen from FIG. 1*d* that the support rails 54*a, b* each have a convexly curved surface 56*a*, 56*b* with which they abut the arcuate concave support surfaces 58*a*, 58*b* of the bearing parts 52*a, b*. The roller bearing guides 50*a, b* are thereby able in a roller-bearing-guided manner to offload onto the roller part 42 forces on the sash part 40 that occur in the displacement direction 20, or vice versa.

An actuation of the handle 22 (see FIG. 1*a*) and thus a displacement of the control projection 46 (see FIG. 1*b*) in the control slot 48 (see FIG. 1*b*) also causes a force on the roller part 42 in the longitudinal direction in addition to the movement of the roller part 42 in the transverse direction 16 (see FIG. 1*a*). This force in the longitudinal direction can be offloaded with low friction by the roller bearing guide(s) 50*a, b*.

FIG. 1*e* shows the carriage arrangement 34 in cross-section. It can be seen from FIG. 1*e* that the support rail 54*a* is designed longer in its longitudinal extension than the bearing part 52*a*, so that the bearing part 52*a* moves along the support rail 54*a* for the movement of the carriage arrangement 34 in the transverse direction 16 (see FIG. 1*a*).

FIGS. 1*f*, 1*g*, 1*h* and 1*i* show the bearing part 52*a*. It can be seen from the figures that the bearing part 52*a* comprises at least one, preferably a plurality of, ball raceways 60*a*, 60*b* in a bearing part body 61. The ball raceways 60*a, b* each comprise at least one groove 62*a*, 62*b* in which multiple balls 64*a*, 64*b* are guided. The grooves 62*a*, 62*b* are designed such that the balls 64*a*, 64*b* protrude from the support surface 58*a* and are guided back inside the bearing part 52*a*.

The bearing part body 61 of the bearing parts 52*a, b* (see FIG. 1*b*), in particular the covers of the bearing part bodies 61 (see FIG. 1*h*), and the support rails 54*a, b* (see FIG. 1*b*) represent roller bearing beds. The rolling bodies in the form of the balls 64*a, b* are supported transversely to the extension of the bearing parts 52*a, b* (see FIG. 1*b*) or the support rails 54*a, b* (see FIG. 1*b*) on the roller bearing beds in order to transmit forces in the direction of the longitudinal extension of the carriage arrangement 34 (see FIG. 1*b*).

Figure 2A:
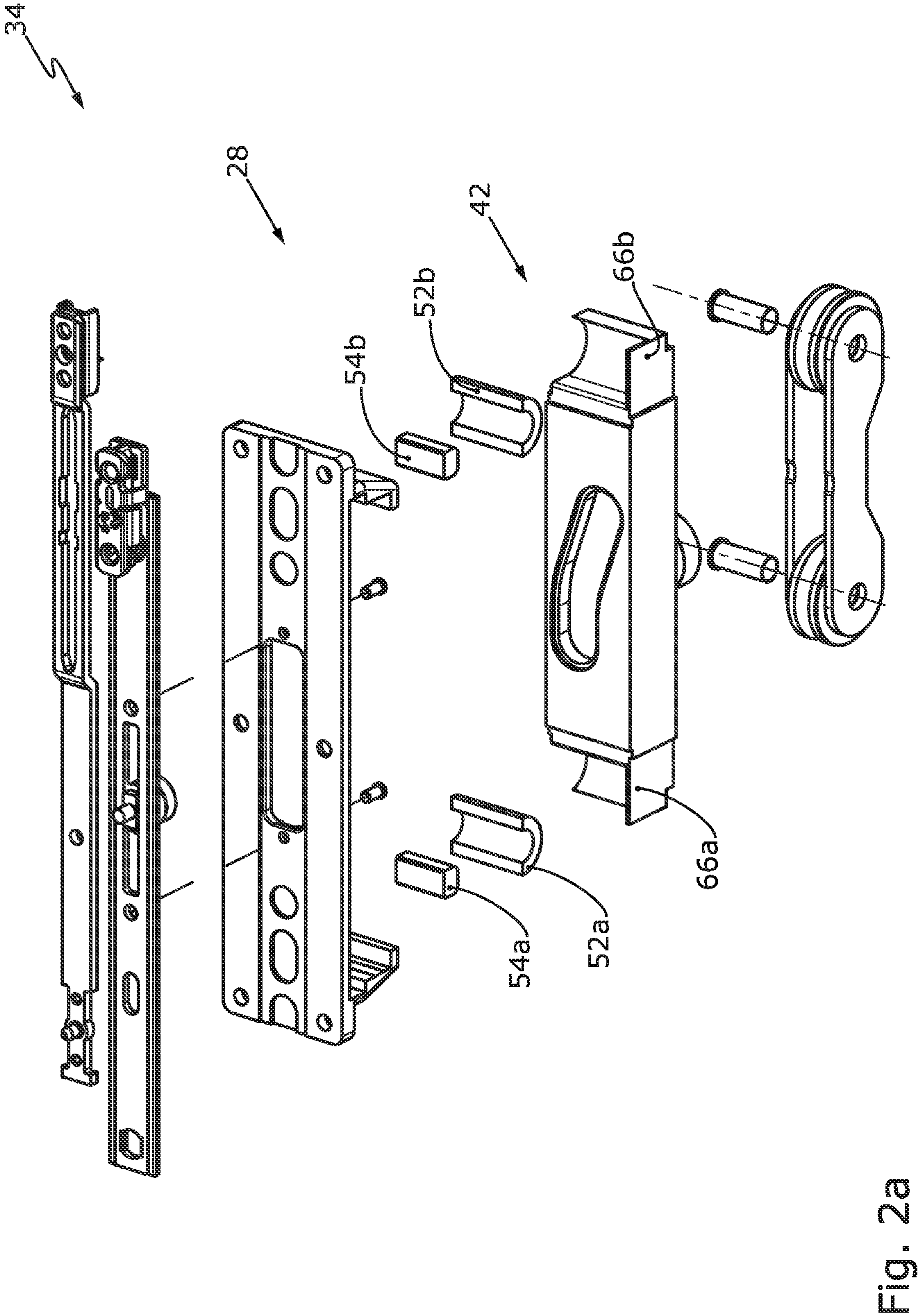
FIG. 2*a* shows an exploded view of a further carriage arrangement with a first roller bearing guide shortened in its longitudinal directions and second roller bearing guide.

FIG. 2*a* shows a carriage arrangement 34 in which support rails 54*a, b* are formed shorter in their longitudinal extension than bearing parts 52*a, b*. The bearing parts 52*a, b* are therefore designed so as to be so short that in side view they are covered by side walls 66*a*, 66*b* of the carriage 28, in particular of the roller part 42. As a result, the penetration of dirt into the bearing parts 52*a, b* can be better prevented.

Figure 3A:
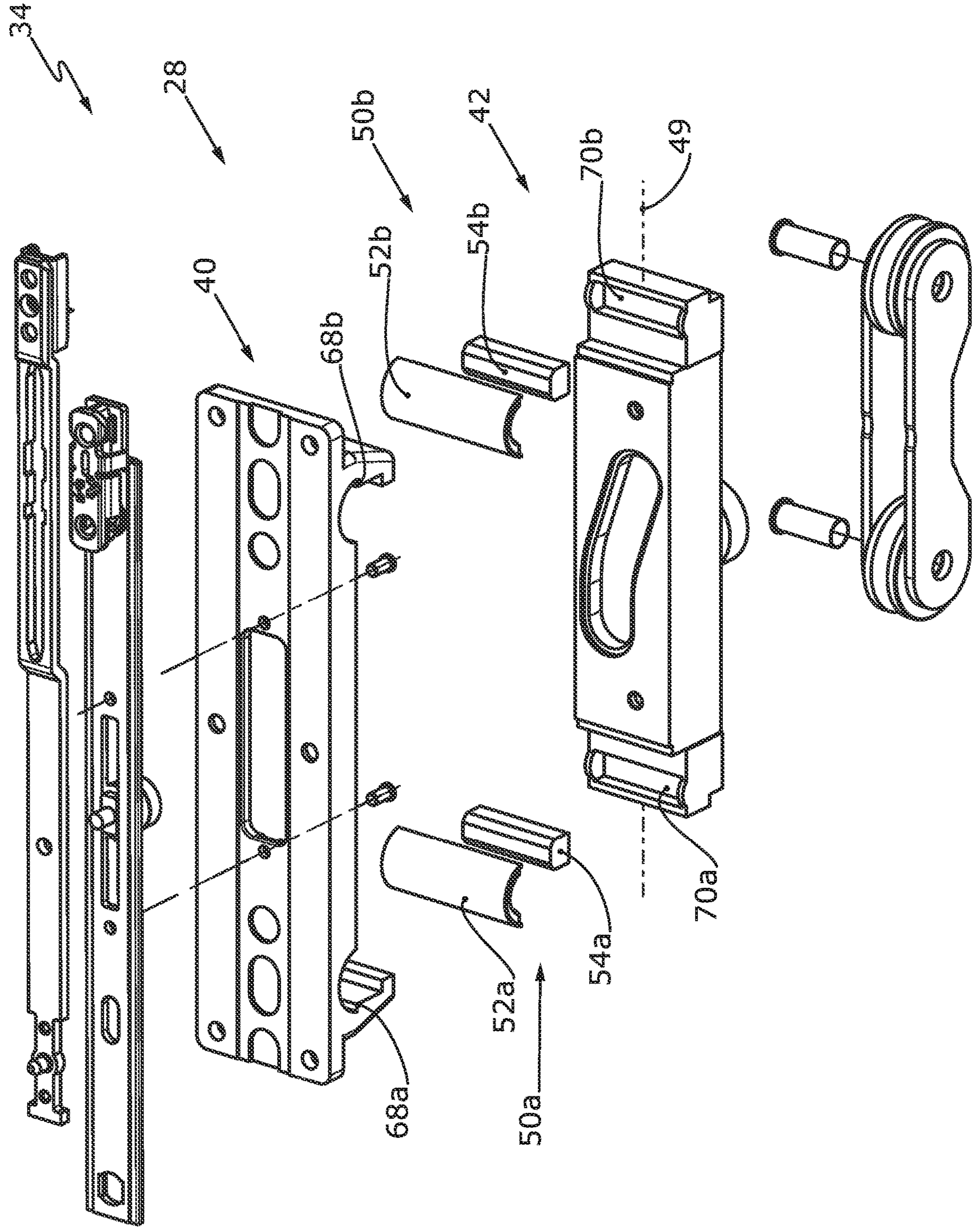
FIG. 3*a* shows an exploded view of a further carriage arrangement which corresponds to the carriage arrangement of FIGS. 1*a-i*, wherein the roller bearing guides are arranged rotated by 180° about their longitudinal axes.

FIG. 3*a* shows a carriage arrangement 34 corresponding to the carriage arrangement in FIG. 1*b*. However, roller bearing guides 50*a*, 50*b* are mounted such that the concave support surfaces 58*a, b* of the bearing parts 52*a, b* are open downwards. The bearing parts 52*a*, 52*b* are mounted so as to be non-pivotable about their longitudinal axis in at least one direction of rotation on the carriage 28, here on the sash part 40. For rotationally fixed mounting, cut-outs 68*a*, 68*b* that form-fit the bearing parts 52*a, b*, are provided on the component (sash part 40 or roller part 42) of the carriage 28, on which the bearing part 52*a, b* is mounted.

The carriage 28 further comprises in each case a recess 70*a*, 70*b* in which the support rails 54*a, b* are inserted in order to prevent a displacement of the support rails 54*a, b* in the direction of the longitudinal axis 49. The support rails 54*a, b* can be loosely inserted into the recesses 70*a, b*.

Figure 4A:
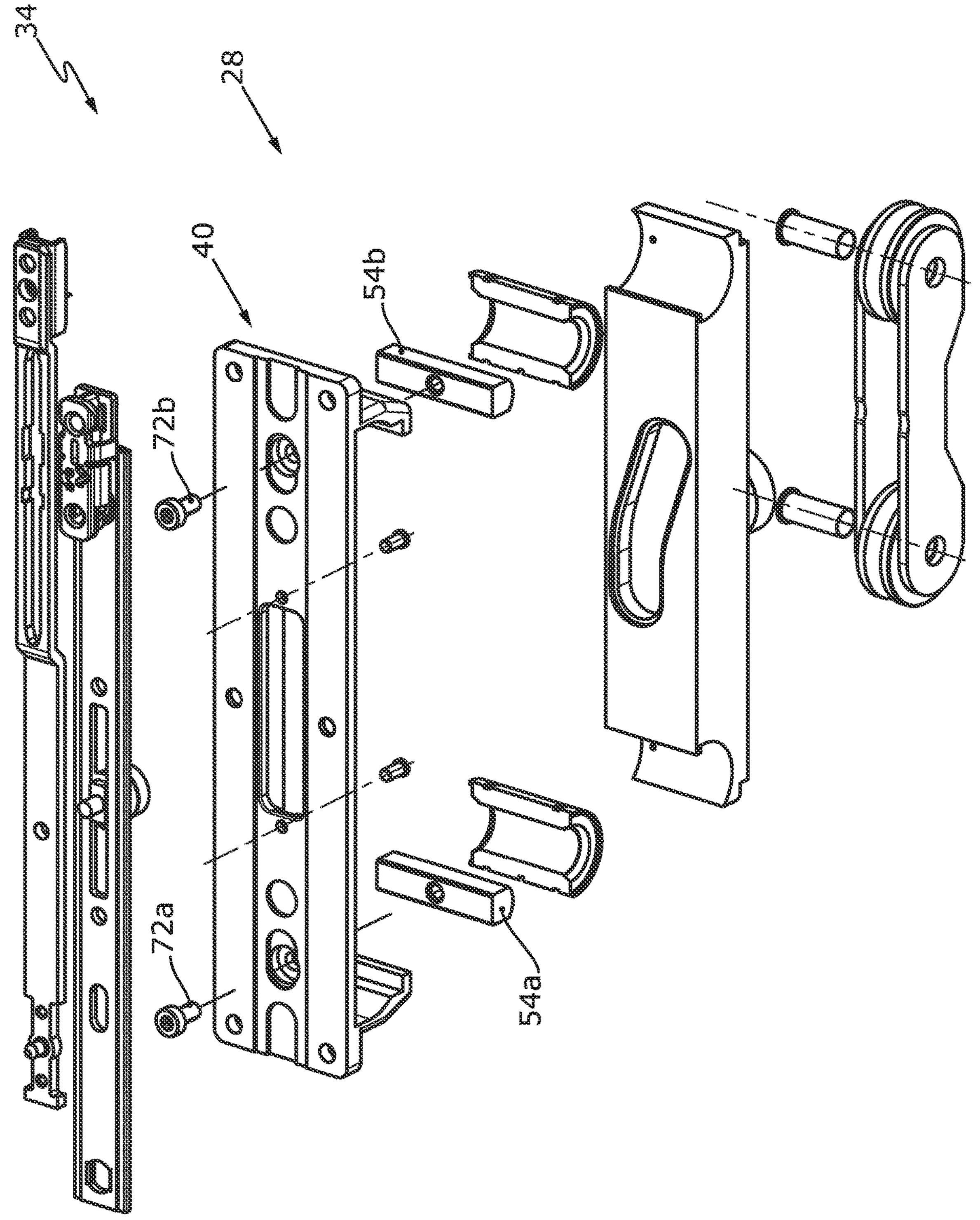
FIG. 4*a* shows an exploded view of a further carriage arrangement which corresponds to the carriage arrangement of FIGS. 1*a-i*, wherein support rails of the roller bearing guides are fastened centrally.

FIG. 4*a* shows a carriage arrangement 34 in which support rails 54*a, b* are fixed centrally on the carriage 28, here on the sash part 40. The fixing can, for example, be effected by screws 72*a, b*.

Figure 5A:
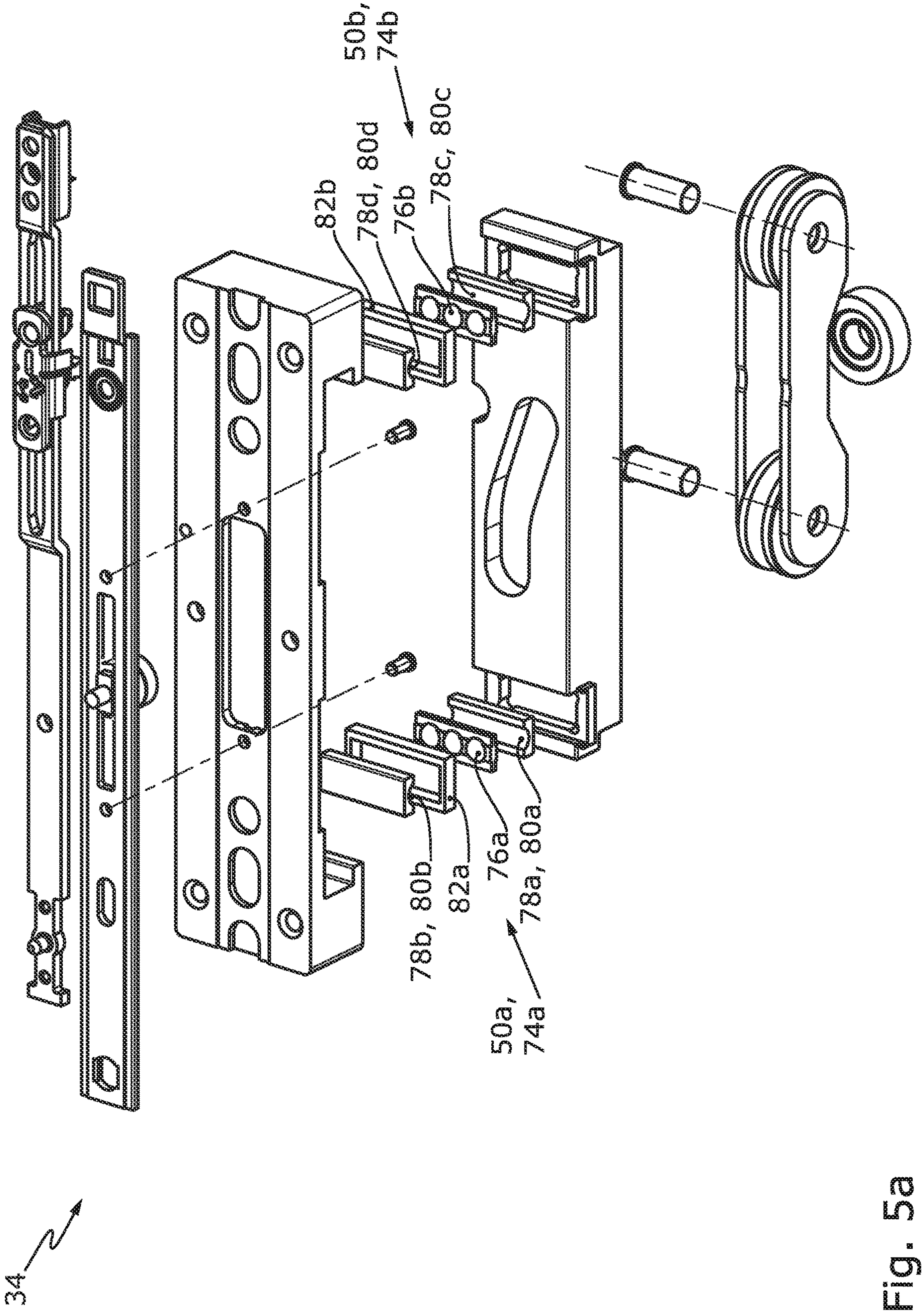
FIG. 5*a* shows an exploded view of a further carriage arrangement, wherein roller bearing guides of the carriage arrangement each have a ball bearing.

FIG. 5*a* shows a carriage arrangement 34 in which roller bearing guides 50*a, b* with ball bearings 74*a*, 74*b* are provided. The ball bearings 74*a, b* have balls 76*a*, 76*b* which are guided in ball bearing beds 78*a*, 78*b*, 78*c*, 78*d*. The ball bearing beds 78*a-d* have grooves 80*a*, 80*b*, 80*c*, 80*d* for guiding the balls 76*a, b*. The balls 76*a, b* thus represent rolling bodies which are guided in roller bearing beds in the form of the ball bearing beds 78*a-d*. The roller bearing guides 50*a, b* further preferably each have a frame 82*a*, 82*b* to prevent dirt from penetrating.

Figure 5B:
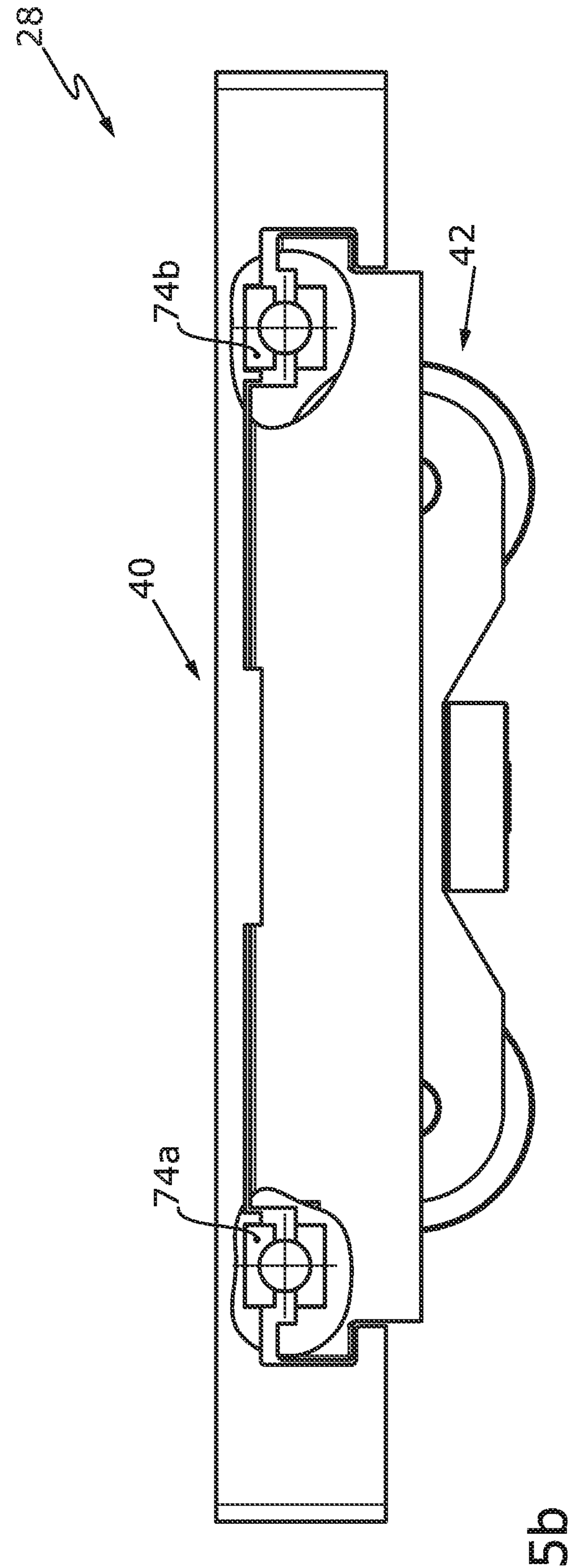
FIG. 5*b* shows a side view of the carriage of the carriage arrangement according to FIG. 5*a*, wherein the roller bearing guides of the carriage are shown in section.

FIG. 5*b* shows the carriage 28 according to FIG. 5*a* in a partially sectioned side view. It can be seen from FIG. 5*b* that the ball bearings 74*a*, 74*b* enable a very low-friction guidance of the sash part 40 on the roller part 42.

Figure 6A:
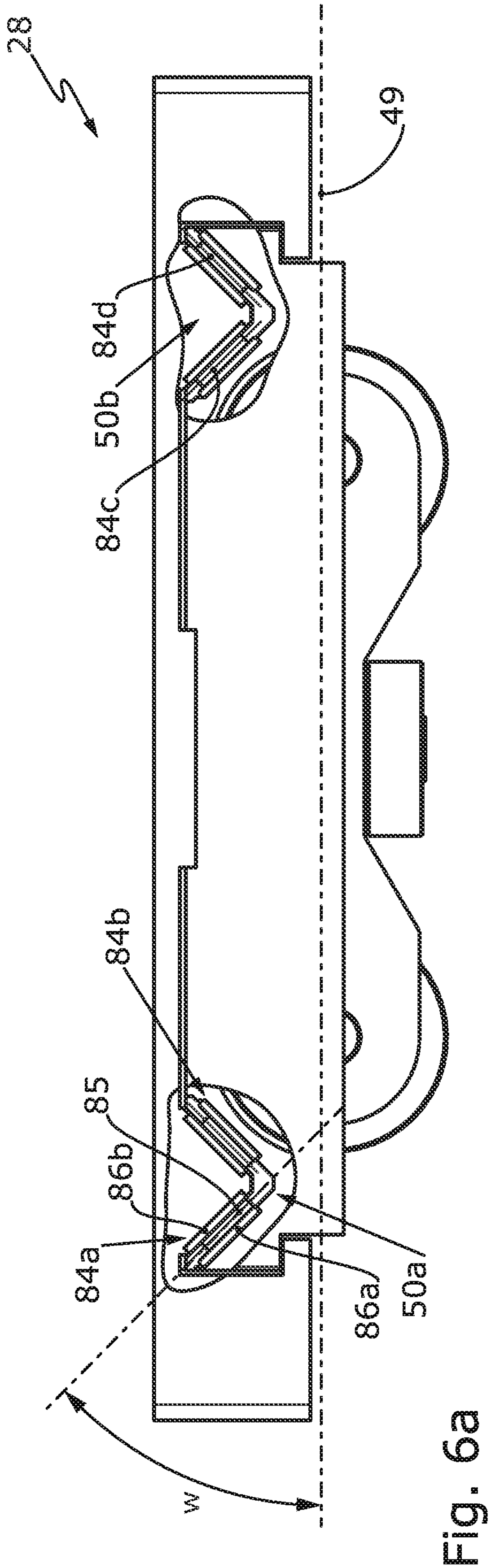
FIG. 6*a* shows a side view of a further carriage which corresponds to the carriage of FIG. 5*b*, wherein roller bearing guides are provided in the form of needle bearings in a V configuration.

FIG. 6*a* shows a carriage 28 in which roller bearing guides 50*a, b* each have at least one needle bearing 84*a*, 84*b*, 84*c*, 84*d*. The needle bearings 84*a-d* have needles, of which for reasons of clarity only one needle 85 is provided with a reference sign in FIG. 6*a*. The needles 85 represent rolling bodies. The needles 85 are arranged between needle bearing beds, of which for reasons of clarity only two needle bearing beds 86*a*, 86*b* are provided with a reference sign in FIG. 6*a*. The needle bearing beds 86*a, b* represent roller bearing beds. At least one needle bearing 84*a-d*, in particular a plurality of needle bearings 84*a-d*, is/are at an angle w of more than 0° and less than 180°, preferably of more than 10° and less than 170°, in relation to the longitudinal axis 49 of the roller part 42. Particularly preferably, at least one roller bearing guide 50*a, b*, in particular two roller bearing guides 50*a, b* have needle bearings 84*a-d* arranged in a V configuration (as shown in FIG. 6*a*).

Figure 7A:
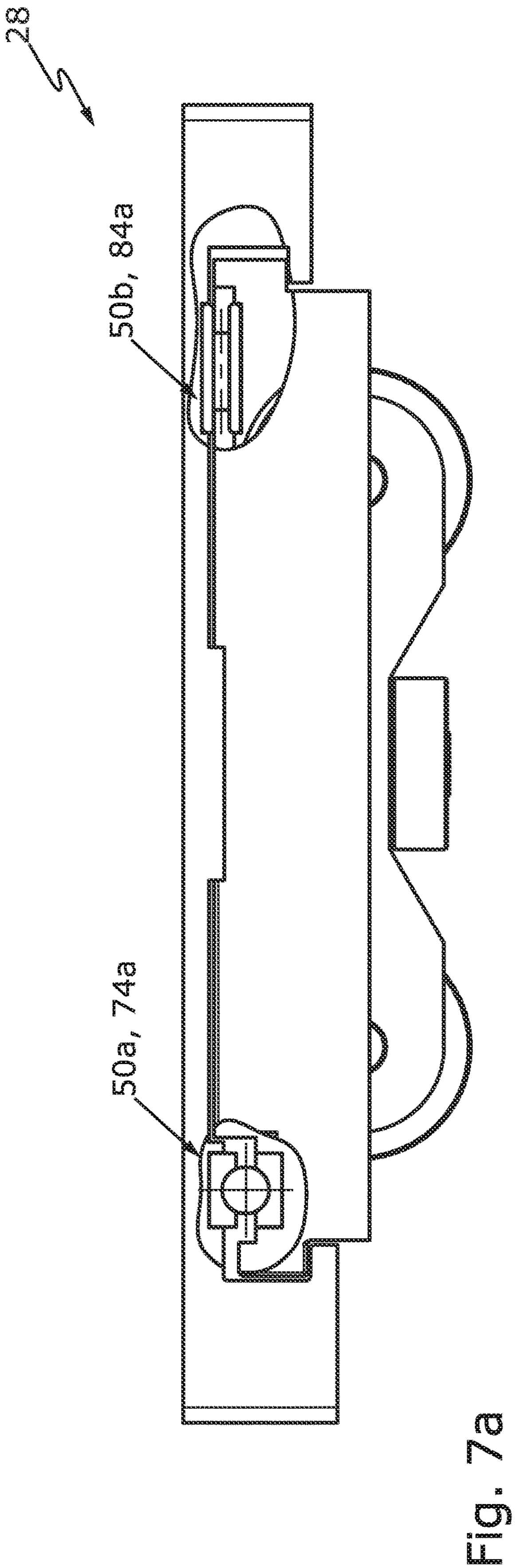
FIG. 7*a* shows a side view of a further carriage corresponding to the carriage of FIG. 5*b*, wherein a first roller bearing guide with a ball bearing is provided and a second roller bearing guide with a needle bearing is provided.

FIG. 7*a* shows a carriage 28 with non-alike roller bearing guides 50*a, b*. A ball bearing 74*a* is here provided for the first roller bearing guide 50*a* and a needle bearing 84*a* for the second roller bearing guide.

Figure 8A:
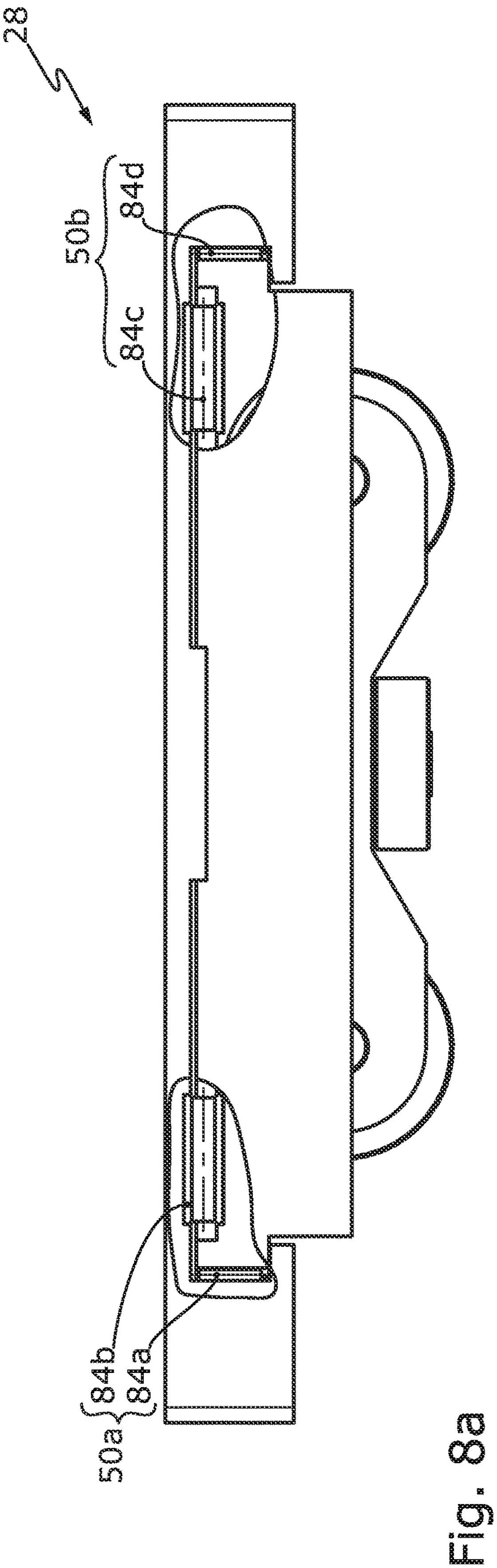
FIG. 8*a* shows a side view of a further carriage corresponding to the carriage of FIG. 5*b*, wherein two roller bearing guides with needle bearings are provided.

FIG. 8*a* shows a carriage 28 with a plurality of needle bearings 84*a-d*. The needle bearings 84*a, b* form the first roller bearing guide 50*a* and the needle bearings 84*c, d* form the second roller bearing guide 50*b*. Here, the needle bearings 84*b*, 84*c* are provided for the offloading of the vertical forces and the needle bearings 84*a*, 84*d* for the transmission of the horizontal forces in the displacement direction 20 (see FIG. 1*a*).

Figure 9A:
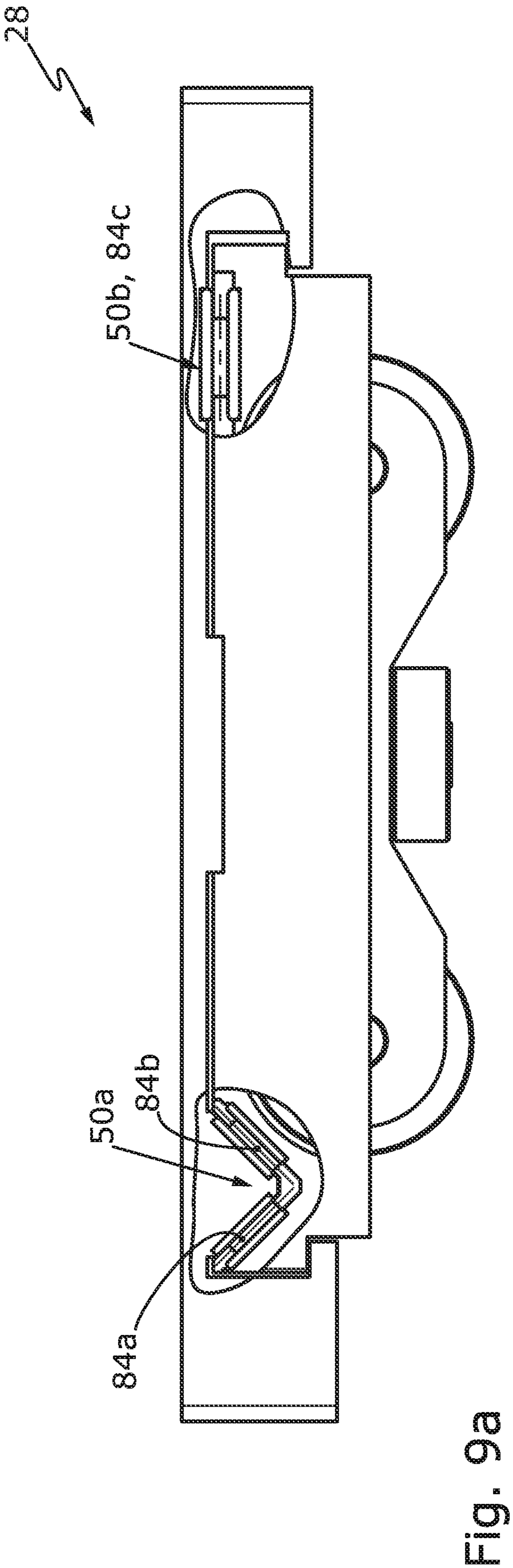
FIG. 9*a* shows a side view of a further carriage corresponding to the carriage of FIG. 5*b*, wherein two roller bearing guides with different needle bearings are provided.

FIG. 9*a* shows a carriage 28 with a first roller bearing guide 50*a*, which has needle bearings 84*a, b* and a second roller bearing guide 50*b*, which likewise has a needle bearing 84*c*, but which is only designed for transmitting vertical forces.

Figure 10A:
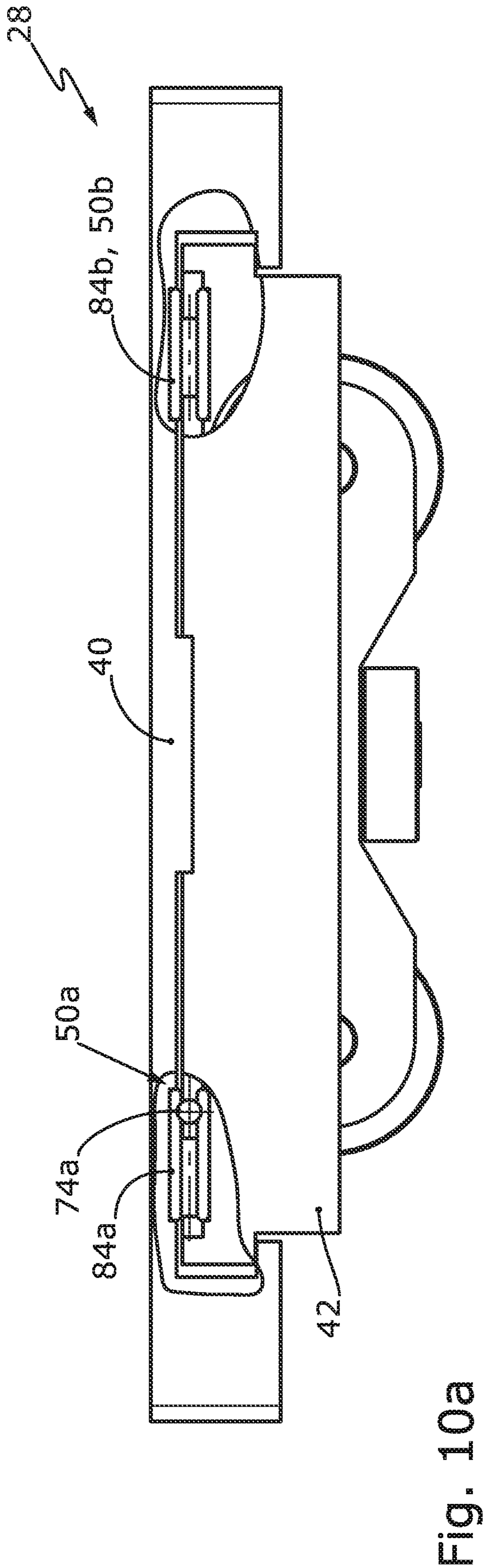
FIG. 10*a* shows a side view of a further carriage which corresponds to the carriage of FIG. 5*b*, wherein a first roller bearing guide has a combination of needle bearings and ball bearings and a second roller bearing guide has a needle bearing.

FIG. 10*a* shows a carriage 28, wherein the carriage 28 has a first roller bearing guide 50*a* with a combination of a horizontally aligned needle bearing 84*a* and a ball bearing 74*a*. The first roller bearing guide 50*a* is thereby capable of offloading not only vertical forces but also horizontal forces from the sash part 40 onto the roller part 42. A second roller bearing guide 50*b* has a needle bearing 84*b* for transmitting vertical forces.

It is common to all exemplary embodiments of the carriages 28, 30 that at least one first roller bearing guide 50*a* provides a roller-bearing-guided support of the sash part 40 on the roller part 42 during the movement of the roller part 42 in the transverse direction 16 (see FIG. 1*a*), that is to say transversely, preferably perpendicularly, to the longitudinal axis 49 of the roller part 42. In this case, the roller-bearing-guided support absorbs not only weight forces but also forces in the longitudinal direction of the roller part 42.

Figure 11C:
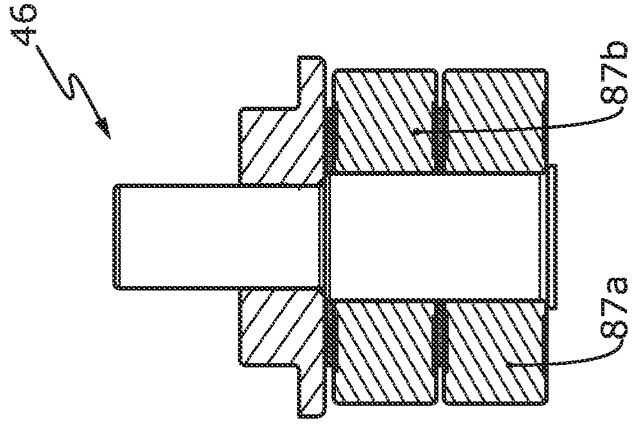
FIG. 11*c* shows a view of the control projection from FIG. 11*b* in longitudinal section.
Figure 11B:
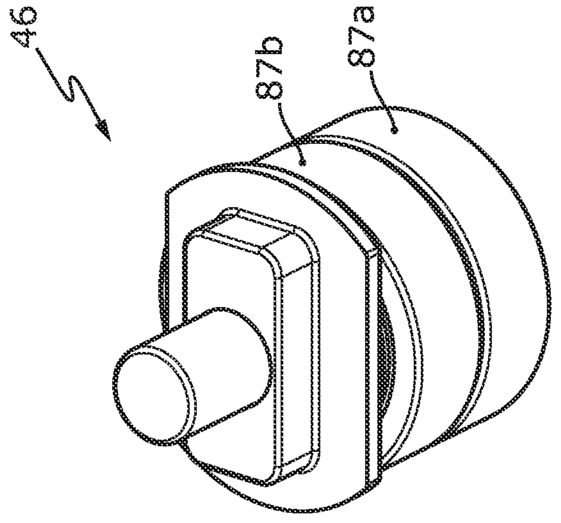
FIG. 11*b* shows an isometric view of the control projection from FIG. 11*a* in the mounted state.
Figure 11A:
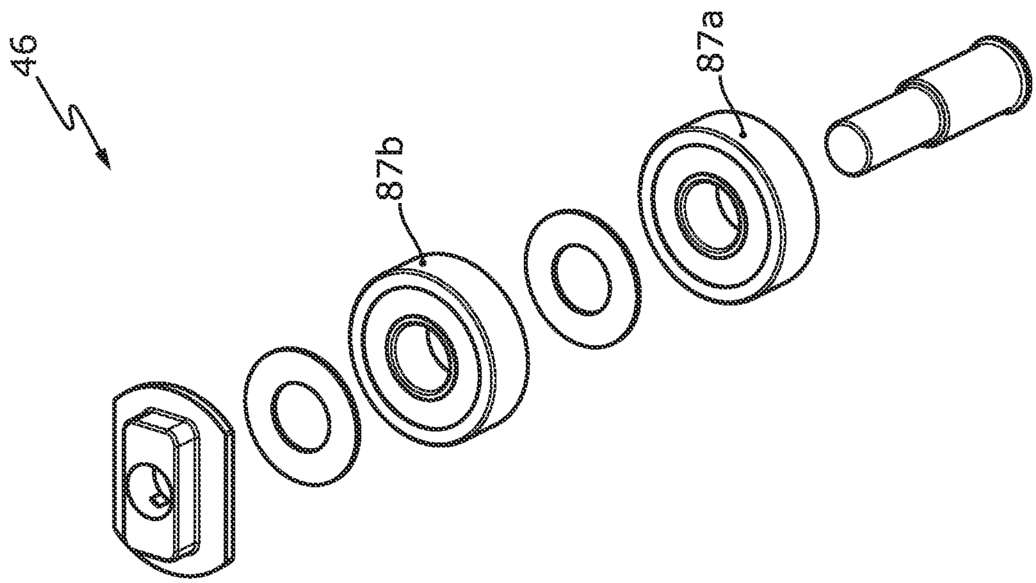
FIG. 11*a* shows an exploded view of a control projection of the carriage arrangement of FIGS. 1*a-i*, wherein the control projection has a roller-bearing-guided roller to guide the control projection in a straight slot in a sash part of the carriage and has a roller-bearing-guided roller to guide the control projection in an oblique slot in a roller part of the carriage.

FIGS. 11*a*-16*c* show different embodiments of the control projection 46:

FIGS. 11*a*, 11*b* and 11*c* show a control projection 46, which has two roller-bearing-guided rollers 87*a*, 87*b*. The roller 87*a* is here provided for guiding in the at least sectionally oblique control slot 48 (see FIG. 1*b*), and the roller 87*b* is provided for guiding in the straight guide slot 55 (see FIG. 1*b*).

Figure 12A:
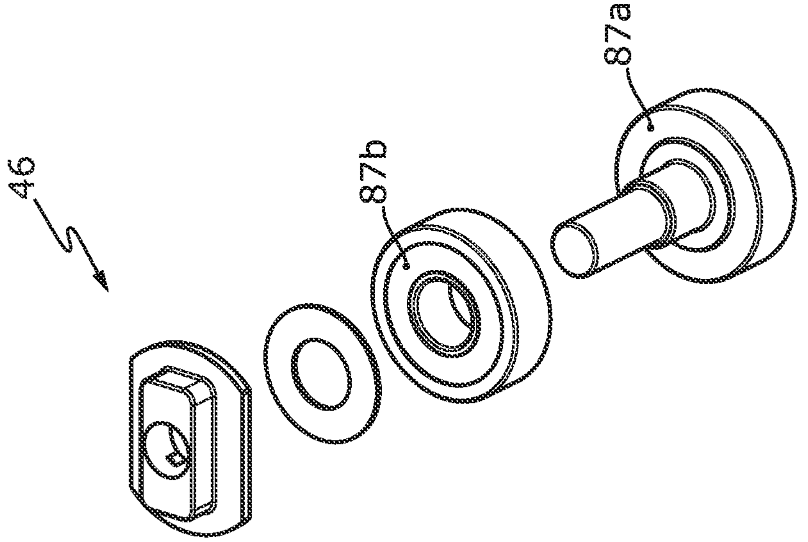
FIG. 12*a* shows an exploded view of a control projection according to FIG. 11*a*, wherein the control projection has a roller-bearing-guided roller to guide the control projection in a straight slot in the sash part and has a fixed roller to guide the control projection in an oblique slot in the roller part.
Figure 12B:
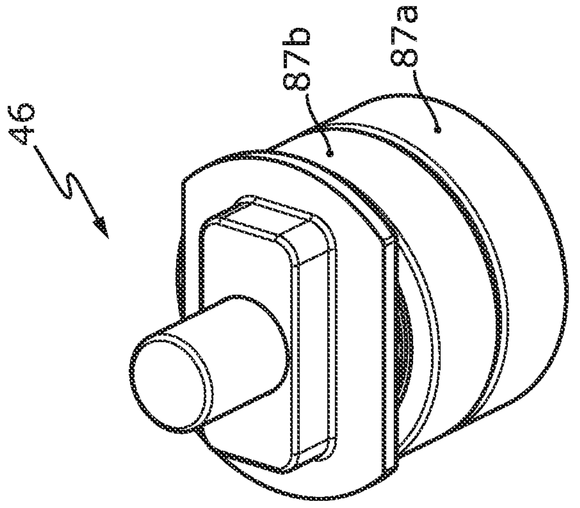
FIG. 12*b* shows an isometric view of the control projection from FIG. 12*a* in the mounted state.
Figure 12C:
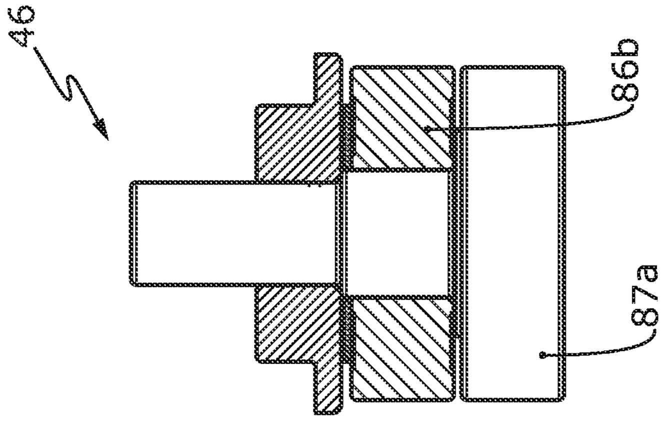
FIG. 12*c* shows a view of the control projection from FIG. 12*b* in longitudinal section.

FIGS. 12*a*, 12*b* and 12*c* show a control projection 46 which has an immovable roller 87*a* for guiding in the at least sectionally oblique control slot 48 (see FIG. 1*b*) and a roller-bearing-guided roller 87*b* for guiding in the straight control slot 55 (see FIG. 1*b*).

Figure 13C:
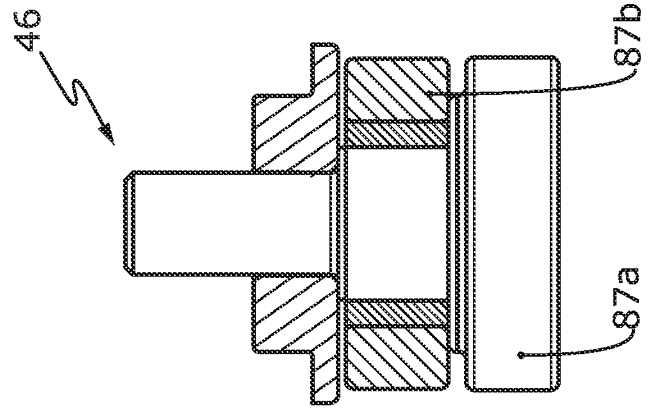
FIG. 13*c* shows a view of the control projection from FIG. 13*b* in longitudinal section.
Figure 13B:
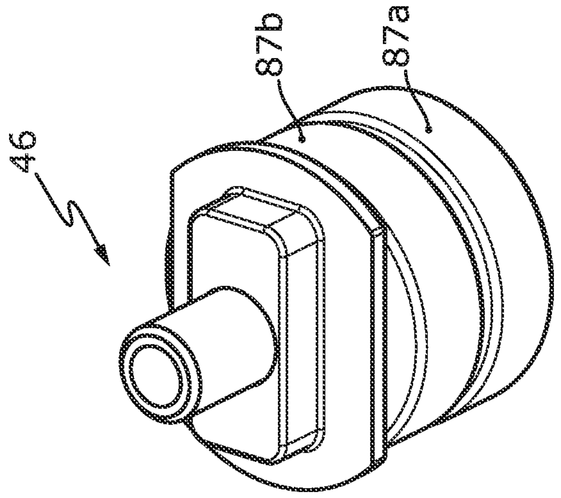
FIG. 13*b* shows an isometric view of the control projection from FIG. 13*a* in the mounted state.
Figure 13A:
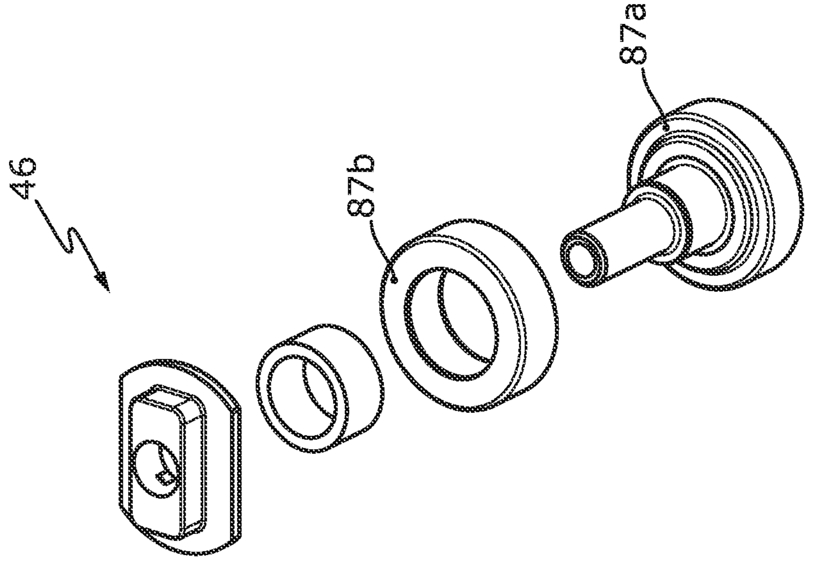
FIG. 13*a* shows an exploded view of a control projection according to FIG. 12*a*, wherein the control projection has a plain-bearing-guided roller to guide the control projection in a straight slot in the sash part and has a fixed roller to guide the control projection in an oblique slot in the roller part.

FIGS. 13*a*, 13*b* and 13*c* show a control projection 46 which has an immovable roller 87*a* for guiding in the at least sectionally oblique control slot 48 (see FIG. 1*b*) and a plain-bearing-guided roller 87*b* for guiding in the straight control slot 55 (see FIG. 1*b*).

Figure 14A:
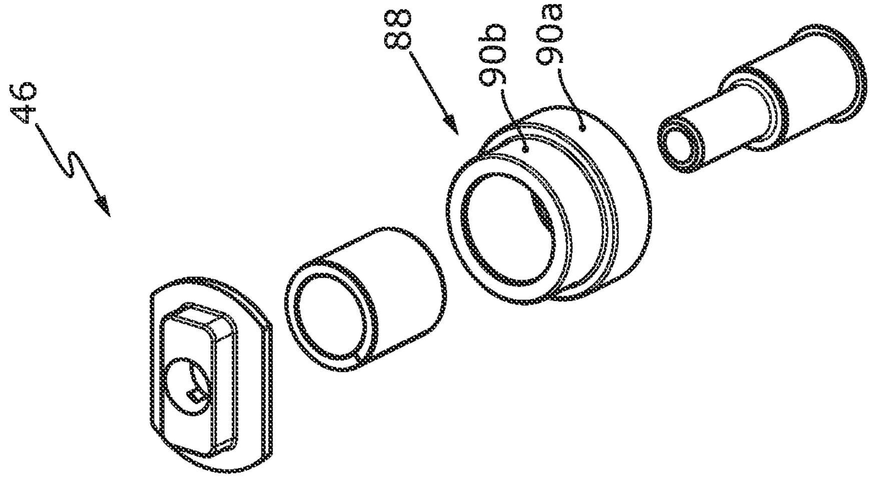
FIG. 14*a* shows an exploded view of a control projection according to FIG. 13*a*, wherein the control projection has a plain-bearing-guided roller to guide the control projection in an oblique slot in the roller part.
Figure 14B:
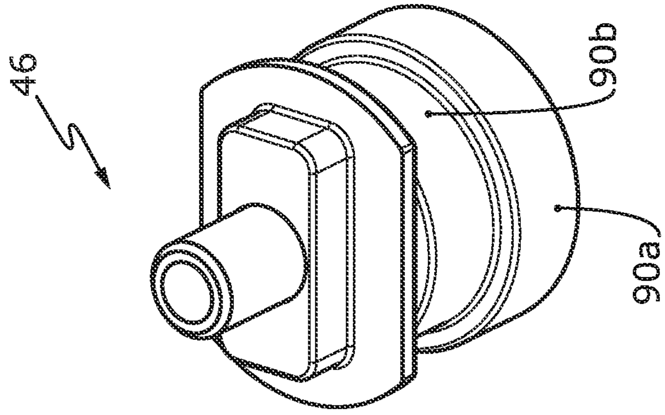
FIG. 14*b* shows an isometric view of the control projection from FIG. 14*a* in the mounted state.
Figure 14C:
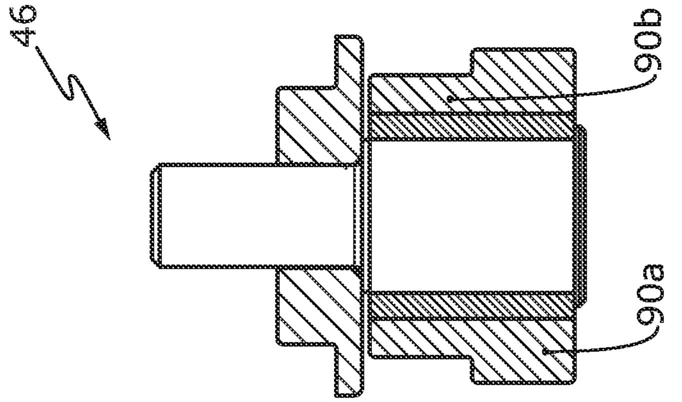
FIG. 14*c* shows a view of the control projection from FIG. 14*b* in longitudinal section.

FIGS. 14*a*, 14*b* and 14*c* show a control projection 46, which has a sleeve 88. The sleeve 88 is plain-bearing-guided. It has a roll-shaped section 90*a* for guiding the sleeve 88 in the at least sectionally oblique control slot 48 (see FIG. 1*b*). The sleeve 88 further comprises a roller-shaped section 90*b* which prevents contact of the control projection 46 with the straight control slot 55 (see FIG. 1*b*). The roller-shaped section 90*b* has a smaller diameter than the roller-shaped section 90*a*.

Figure 15C:
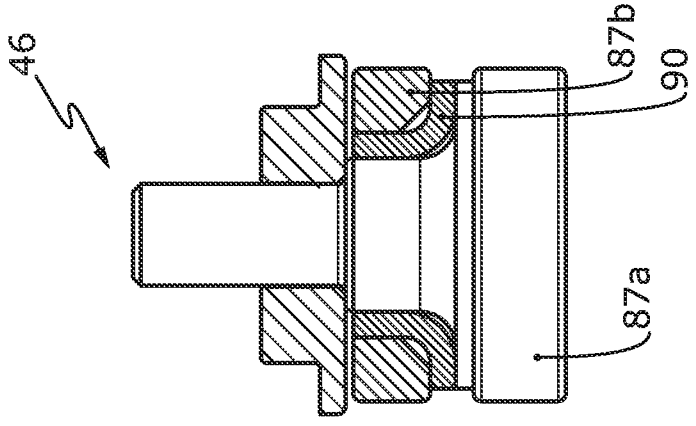
FIG. 15*c* shows a view of the control projection from FIG. 15*b* in longitudinal section.
Figure 15B:
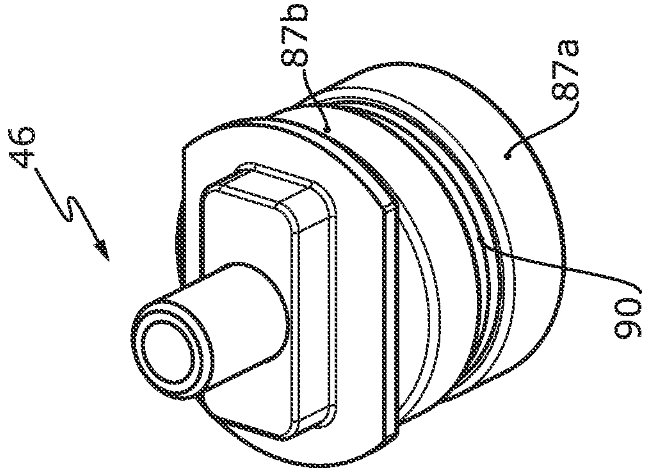
FIG. 15*b* shows an isometric view of the control projection from FIG. 15*a* in the mounted state.
Figure 15A:
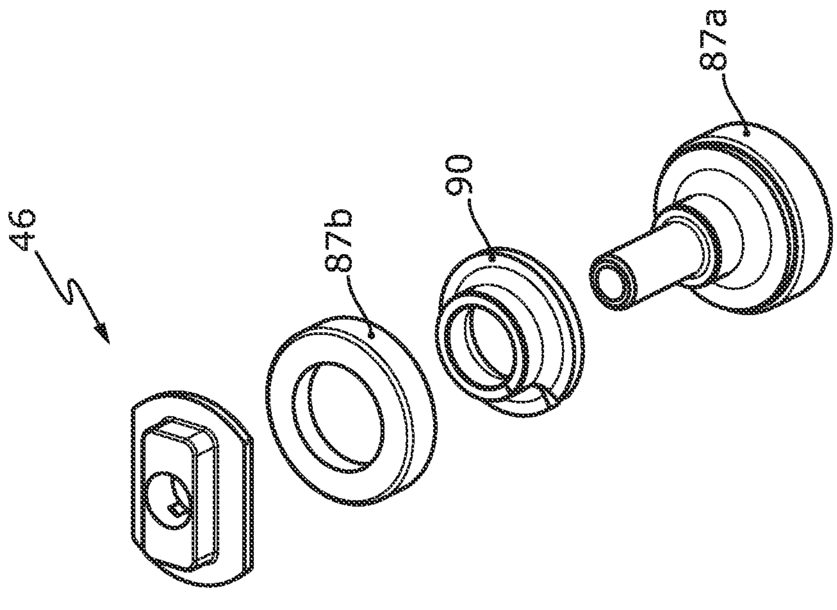
FIG. 15*a* shows an exploded view of a control projection according to FIG. 13*a*, wherein the control projection has a variant of a plain-bearing-guided roller to guide the control projection in a straight slot in the sash part and has a fixed roller to guide the control projection in an oblique slot in the roller part.

FIGS. 15*a*, 15*b* and 15*c* show a control projection 46 which has an immovable roller 87*a* for guiding in the at least sectionally oblique control slot 48 (see FIG. 1*b*) and a plain-bearing-guided roller 87*b* for guiding in the straight control slot 55 (see FIG. 1*b*). Here the roller 87*b* is mounted on a sleeve 90 which is widened in sections in order to space the roller 87*b* vertically apart from the roller 87*a*.

Figure 16C:
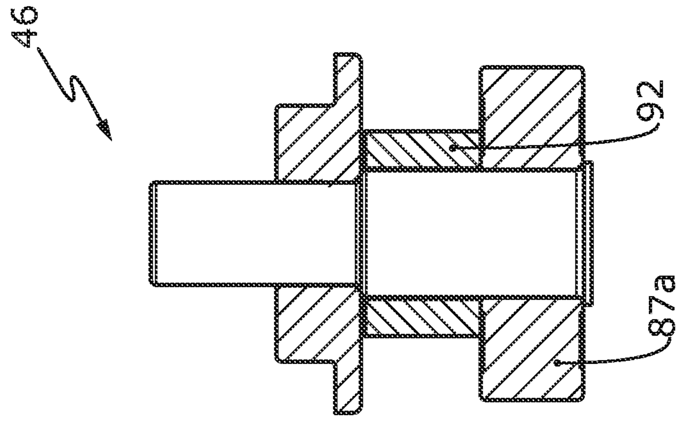
FIG. 16*c* shows a view of the control projection from FIG. 16*b* in longitudinal section.
Figure 16B:
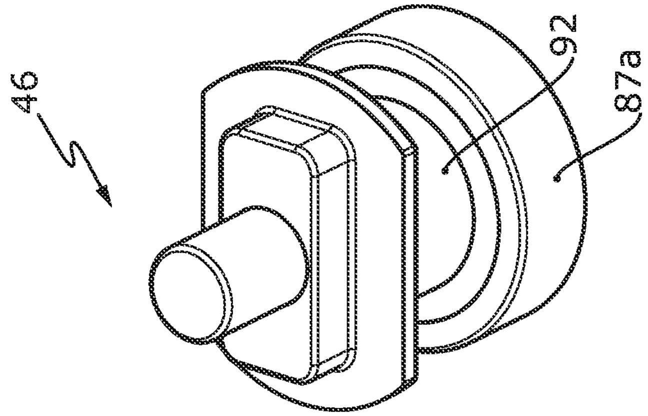
FIG. 16*b* shows an isometric view of the control projection from FIG. 16*a* in the mounted state.
Figure 16A:
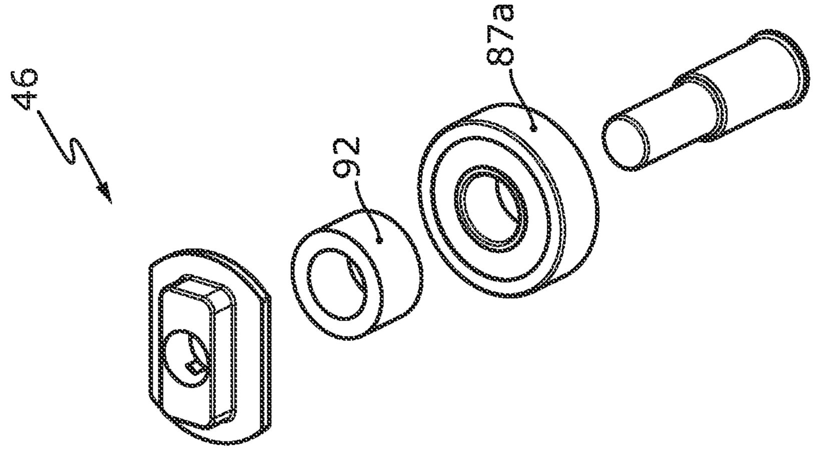
FIG. 16*a* shows an exploded view of a control projection according to FIG. 15*a*, wherein the control projection has a sleeve to provide a distance from a roller bearing and has a roller-bearing-guided roller to guide the control projection in an oblique slot in the roller part.

FIGS. 16*a*, 16*b* and 16*c* show a control projection 46 which has a roller-bearing-guided roller 87*a* for guiding the control projection 46 in the at least sectionally oblique control guide 48 (see FIG. 1*b*). Furthermore, the control projection 46 has a sleeve 92 in order to keep the roller-bearing-guided roller 87*a* at a distance.

FIGS. 17*a*-21*b* show different variants of a carriage arrangement 34 with a connection of a carriage 28 to a driving bar arrangement 26 by at least one holding means in order to facilitate the installation of the carriage arrangement 34 and to prevent the entry of dirt during installation on the sash 14 (see FIG. 1*a*). This further ensures that the carriage 28 is exactly in alignment with the driving bar arrangement 26 and the movement of the control projection 46 (see FIG. 1*b*) in the straight guide slot 55 (see FIG. 1*b*) is ensured with little wear.

Figure 17A:
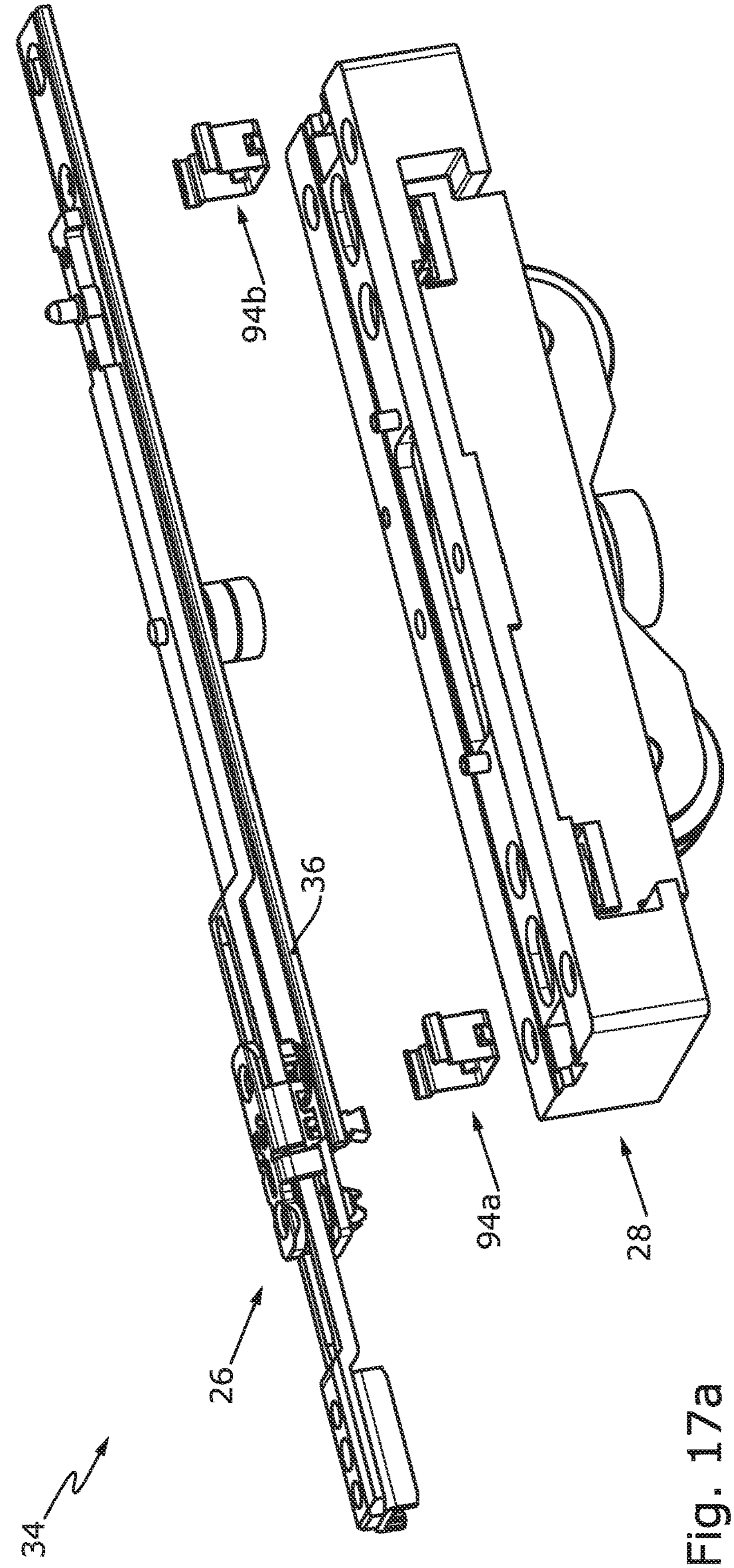
FIG. 17*a* shows an exploded view of a carriage arrangement according to FIGS. 1*a-i*, wherein clips are provided to connect a driving bar arrangement to the carriage.
Figure 17B:
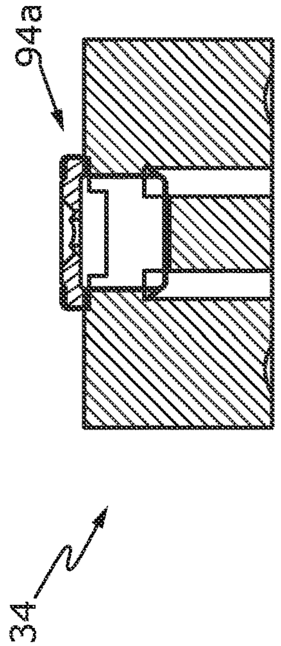
FIG. 17*b* shows a view of a cross-section of the carriage arrangement from FIG. 17*a* in the region of a clip.

FIGS. 17*a*, 17*b* show a carriage arrangement 34 in which the driving bar arrangement 26 is held on the carriage 28 by means of at least one clip 94*a*, 94*b*. In particular, the lipped rail 36 of the driving bar arrangement 26 is fixed to the carriage 28 via the at least one clip 94*a, b*. For aligning the driving bar arrangement 26 on the carriage 28, a contact projection (not shown) can be provided, in particular on the driving bar arrangement 26.

Figure 18A:
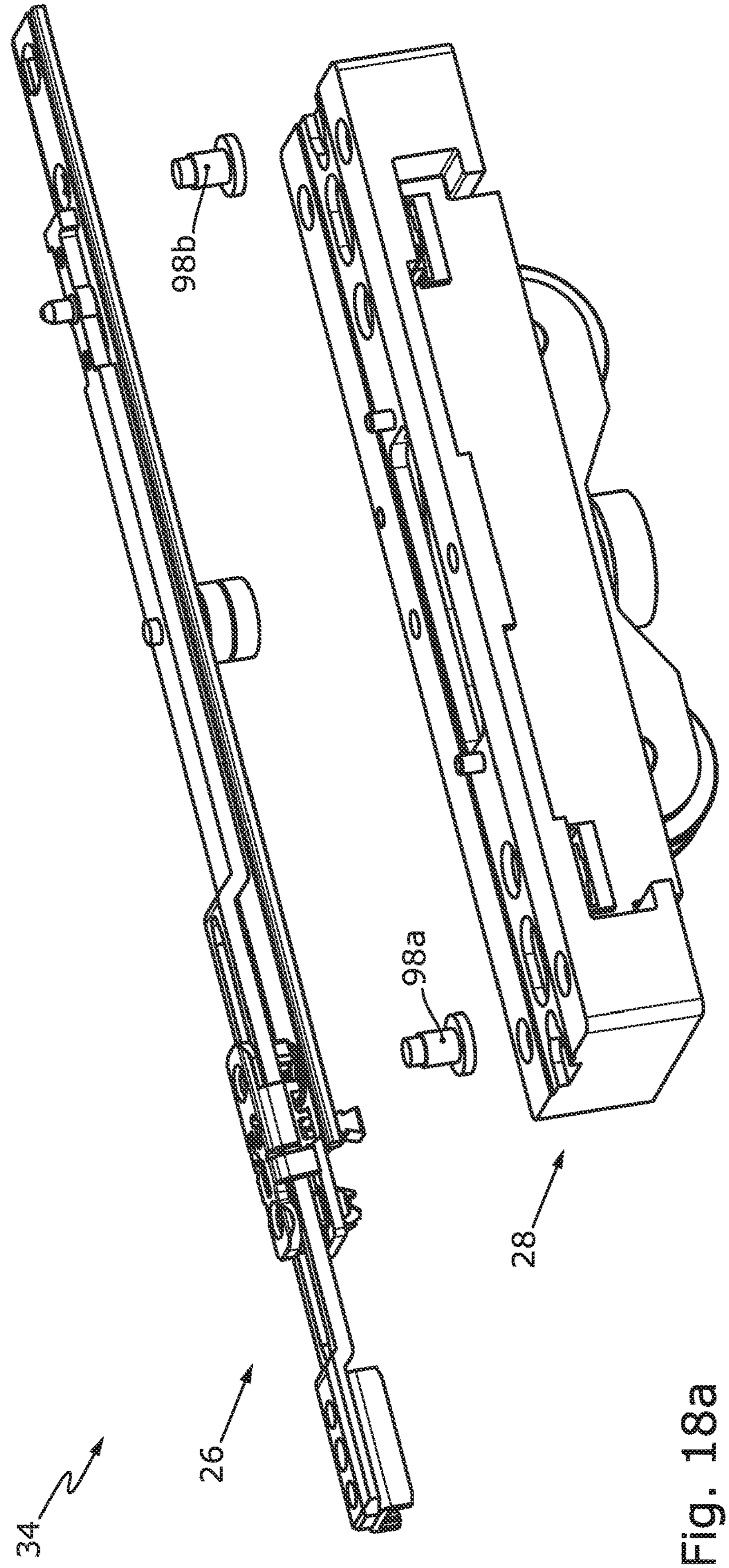
FIG. 18*a* shows an exploded view of a further carriage arrangement according to FIGS. 17*a-b*, wherein rivets are provided to fasten the driving bar arrangement to the carriage.
Figure 18B:
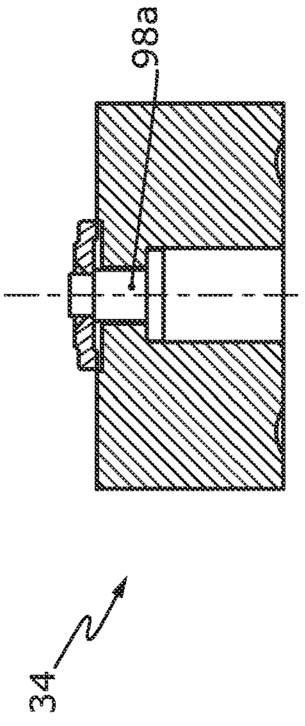
FIG. 18*b* shows a view of a cross-section of the carriage arrangement from FIG. 18*a* in the region of a rivet.

FIGS. 18*a*, 18*b* show a carriage arrangement 34 in which the driving bar arrangement 26 is held on the carriage 28 by means of at least one rivet 98*a*, 98*b*.

Figure 19A:
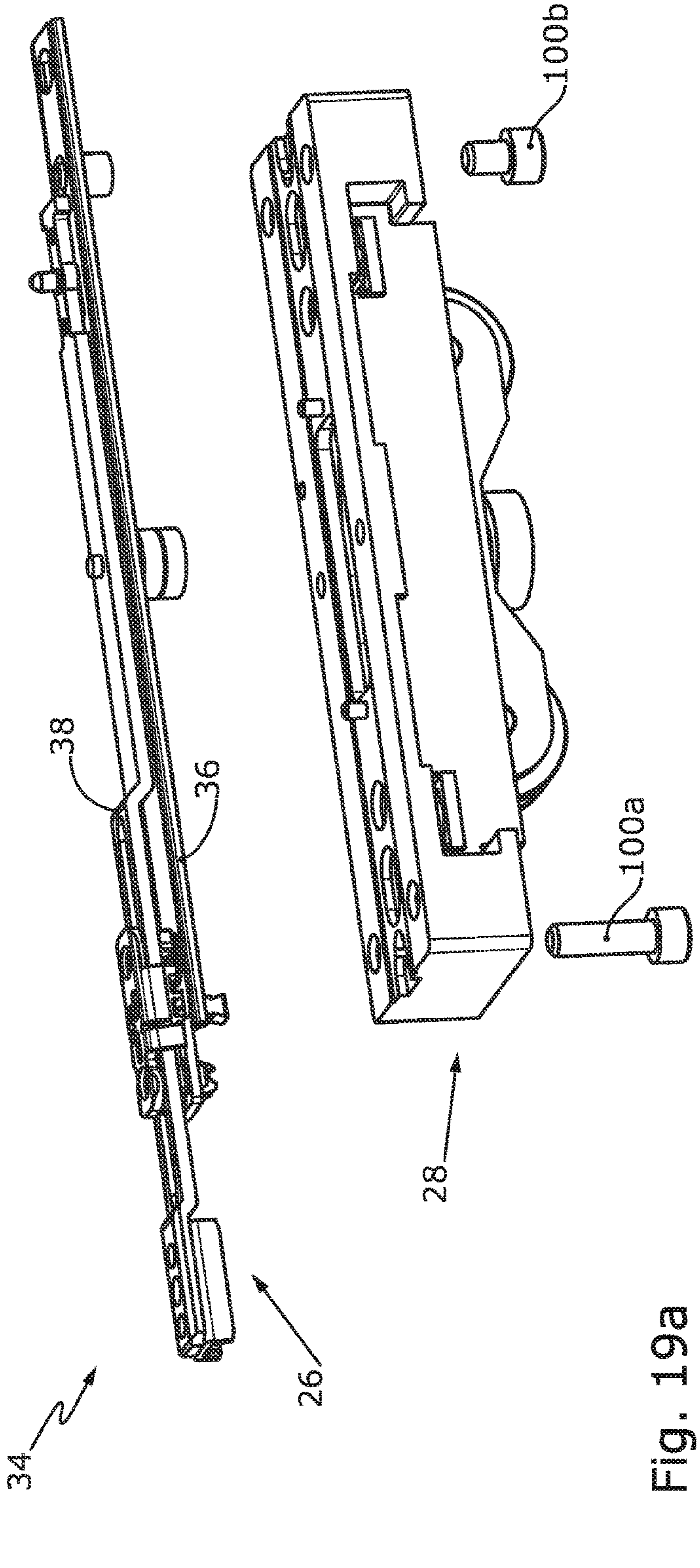
FIG. 19*a* shows an exploded view of a further carriage arrangement according to FIGS. 18*a-b*, wherein screws are provided to fasten the driving bar arrangement to the carriage.
Figure 19B:
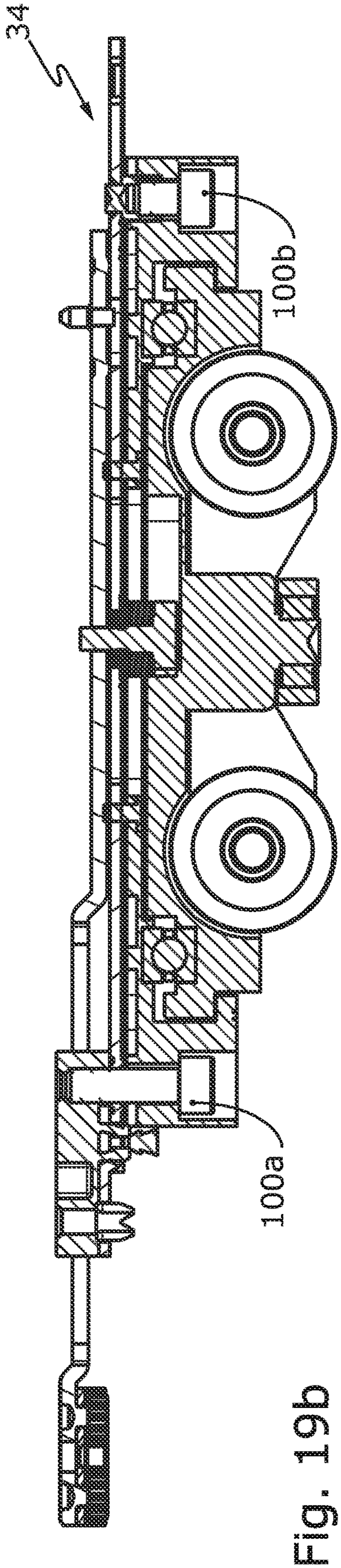
FIG. 19*b* shows a view of a longitudinal section of the carriage arrangement from FIG. 19*a*.

FIGS. 19*a*, 19*b* show a carriage arrangement 34 in which the driving bar arrangement 26 is held on the carriage 28 by means of at least one screw 100*a*, 100*b*.

Figure 20A:
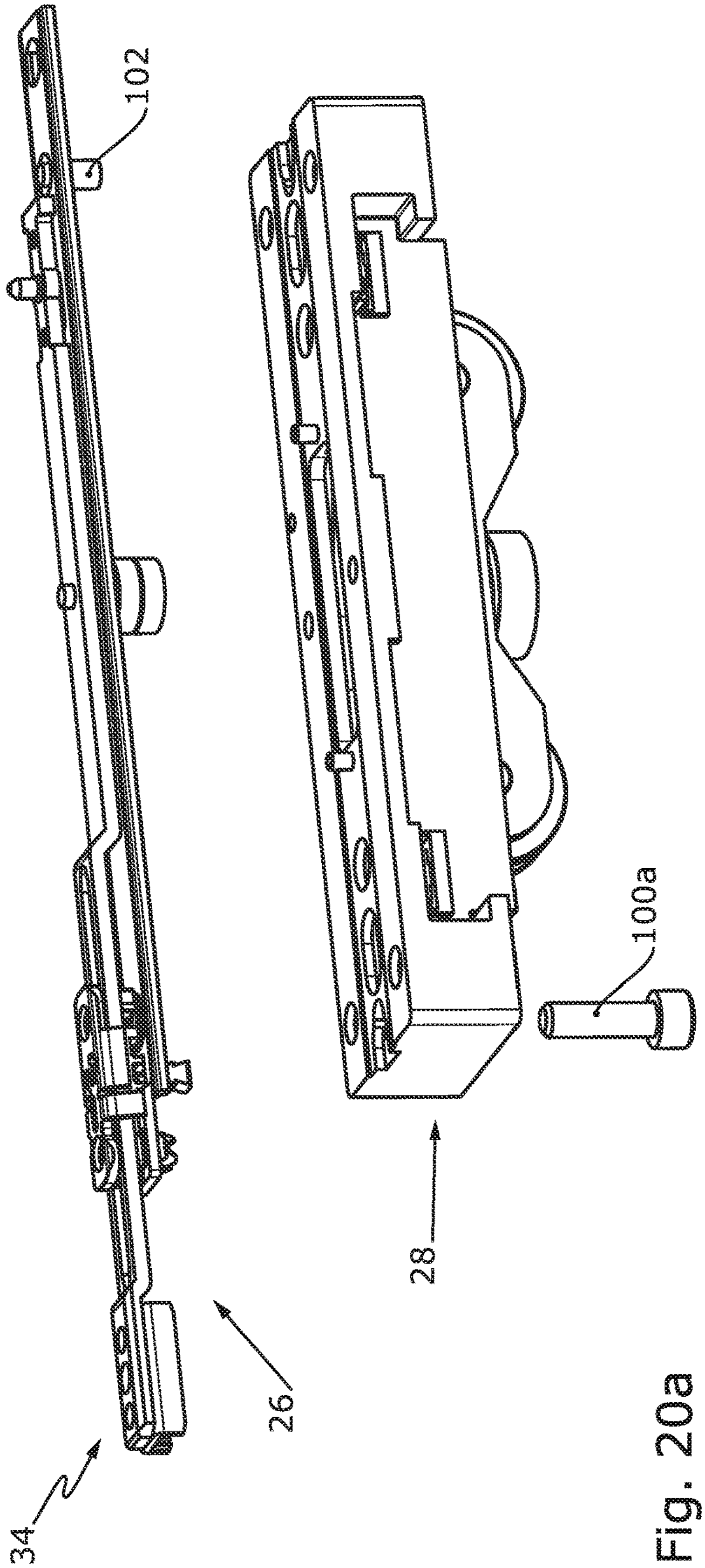
FIG. 20*a* shows an exploded view of a further carriage arrangement according to FIGS. 19*a-b*, wherein a screw and a bolt are provided in order to fasten the driving bar arrangement to the carriage.
Figure 20B:
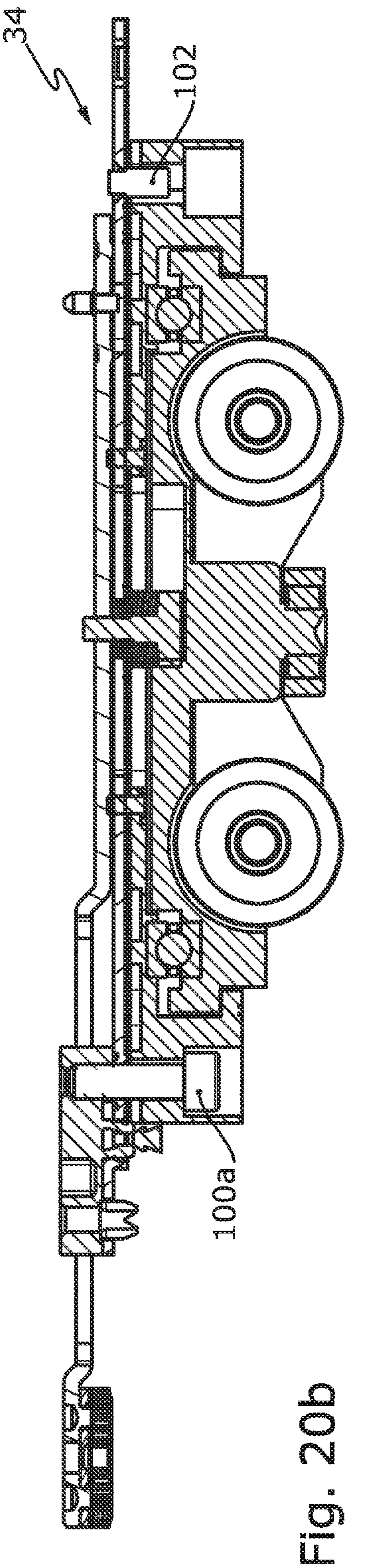
FIG. 20*b* shows a view of a longitudinal section of the carriage arrangement from FIG. 20*a*.

FIGS. 20*a*, 20*b* show a carriage arrangement 34 in which the driving bar arrangement 26 is held on the carriage 28 by a screw 100*a*. Furthermore, a bolt 102 is provided in order to align the driving bar arrangement 26 on the carriage 28.

Figure 21A:
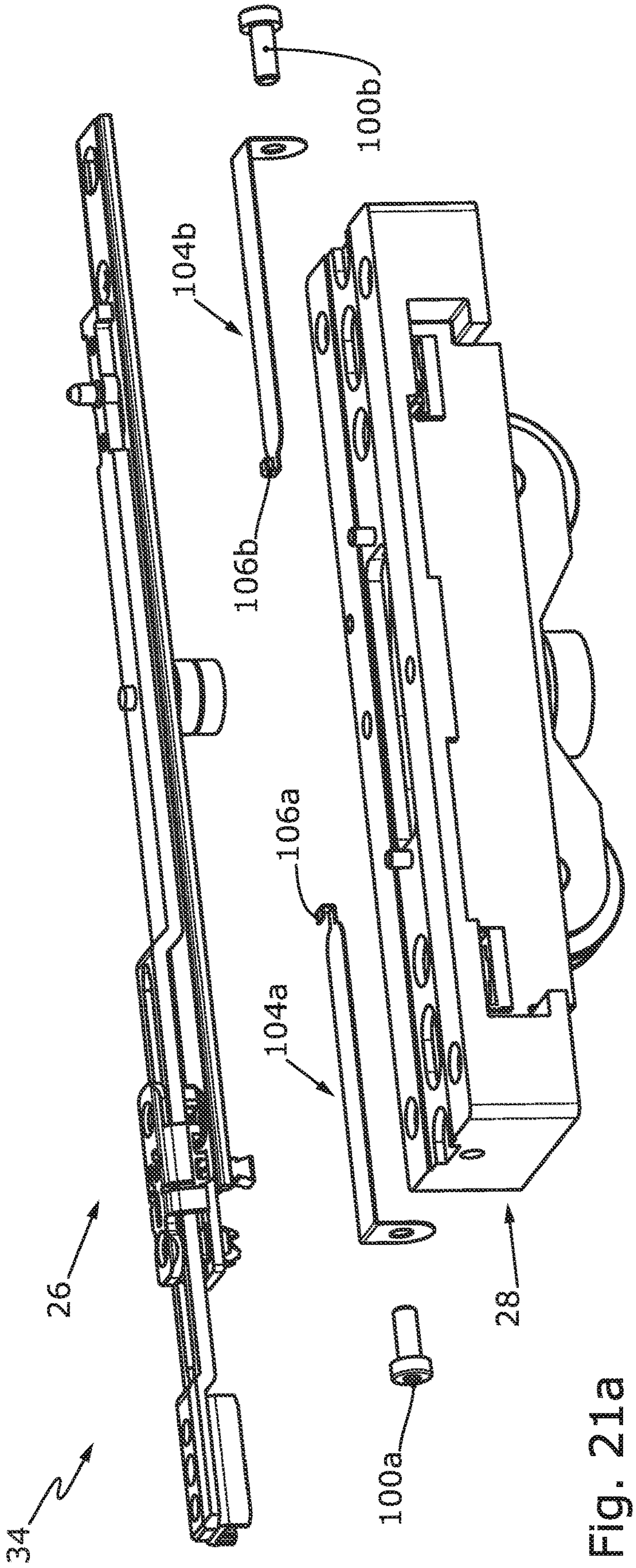
FIG. 21*a* shows an exploded view of a further carriage arrangement according to FIGS. 20*a-b*, wherein two metal plates provided with hooks are provided in order to fasten the driving bar arrangement to the carriage.
Figure 21B:
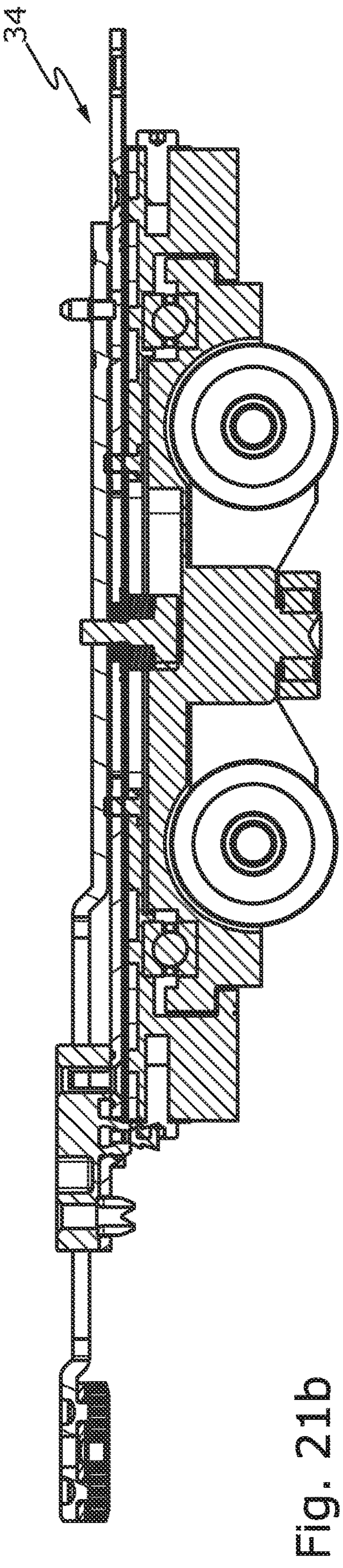
FIG. 21*b* shows a view of a longitudinal section of the carriage arrangement from FIG. 21*a*.

FIGS. 21*a*, 21*b* show a carriage arrangement 34 in which the driving bar arrangement 26 is held on the carriage 28 by metal plates 104*a*, 104*b*.

The metal plates 104*a, b* can each be provided with a hook 106*a*, 106*b* for fastening to the driving bar arrangement 26 or to the carriage 28. The metal plates 104*a, b* can alternatively or additionally be fastened by screws 100*a, b* to the driving bar arrangement 26 or to the carriage 28.

Taking an overview of all figures of the drawings, the invention relates in summary to a carriage arrangement 34 with a driving bar arrangement 26 and a carriage 28, 30. The carriage 28, 30 has a roller part 42 with a plurality of rollers 44*a, b*. The roller part 42 is displaceable transversely, in particular perpendicularly, to the longitudinal extension of the carriage 28, 30 towards a sash part 40 which can be mounted immovably on a sash 14. A driving bar 38 of the driving bar arrangement 26 has a control projection 46 which engages in a control slot 48 formed at least sectionally obliquely to the longitudinal extension of the carriage 28, 30. For guiding the roller part 42 on the sash part 40, a first roller bearing guide 50*a* is provided, which extends transversely, in particular perpendicularly, to the longitudinal extension of the carriage 28, 30. The first roller bearing guide 50*a* has rolling bodies, in particular balls 64*a, b*, 76*a, b* or needles 85, which in the direction of the longitudinal extension of the carriage 28, 30 are supported preferably not only on the sash part 40 but also on the roller part 42, in order to offload forces acting in the direction of the longitudinal extension of the carriage 28, 30 from the sash part 40 onto the roller part 42 with low friction.

LIST OF REFERENCE SIGNS

10 Door
12 Fixed frame
14 Sash
16 Transverse direction
18 Main plane
20 Displacement direction
22 Handle
24 Mechanism
26 Driving bar arrangement
28 Carriage
30 Carriage
32 Running rail
34 Carriage arrangement
36 Lipped rail
38 Driving bar
40 Sash part
42 Roller part
44*a, b* Rollers
46 Control projection
47 Slot
48 Control slot
49 Longitudinal axis of the roller part 42
50*a* First roller bearing guide
50*b* Second roller bearing guide
52*a, b* Bearing part
54*a, b* Support rail
55 Straight guide slot
56*a, b* Curved surface of the support rail 54*a, b*
58*a, b* Support surface of the bearing parts 52*a, b*
60*a, b* Ball raceway
61 Bearing part body
62*a, b* Groove in the ball raceway 60*a, b*
64*a, b* Ball of the ball raceway 60*a, b*
66*a, b* Side wall
68*a, b* Cut-out
70*a, b* Recess
72*a, b* Screw
74*a, b* Ball bearing
76*a, b* Ball
78*a-d* Ball bearing bed
80*a-d* Groove
82*a, b* Frame
84*a-d* Needle bearing
85 Needle
86*a, b* Needle bearing bed
87*a, b* Roller
88 Sleeve
90 Sectionally expanded sleeve
92 Sleeve
94*a, b* Clip
98*a, b* Rivet
100*a, b* Screw
102 Bolt
104*a, b* Metal plate
106*a, b* Hook
w Angle of the needle bearing 84*a* to the longitudinal axis 49

What is claimed is:

1. A carriage arrangement for displacing a sash of a window or door in a displacement direction that is parallel to a main plane of a fixed frame of the window or door and for shifting the sash transversely to this main plane in a transverse direction while preventing movement of the sash relative to the fixed frame in a vertical direction, the transverse direction being perpendicular to the displacement direction and the vertical direction being perpendicular to the displacement direction and the transverse direction, wherein the carriage arrangement comprises the following:

a) a driving bar arrangement which can be arranged on the sash and which has a driving bar movable in a groove peripheral direction;

b) a carriage having a sash part which can be fastened to the sash and a roller part which can be shifted transversely to the main plane and has a plurality of rollers for displacement in the displacement direction;

wherein the driving bar arrangement comprises a control projection which is arranged or formed on the driving bar and which is guided in a control slot in the roller part, which control slot is formed at least sectionally obliquely to the main plane, wherein a movement of the driving bar causes the roller part to shift transversely to the main plane;

c) a first roller bearing guide via which the sash part is supported transversely to the main plane on the roller part during the movement in order to offload the weight of the sash onto the roller part;

wherein the sash part is supported on the roller part in the displacement direction via the first roller bearing guide wherein forces occurring on the roller part in the displacement direction are configured to be introduced into the sash part via the first roller bearing guide;

wherein the first roller bearing guide has a first roller bearing bed on the sash part and a second roller bearing bed on the roller part, and wherein a plurality of rolling bodies of the first roller bearing guide are between the first and second roller bearing beds and are configured to allow movement of the sash part relative to the roller part in the transverse direction while resisting movement and transferring forces of the sash part relative to the roller part in the displacement direction;

wherein the pluralities of rolling bodies are configured to transfer a vertical force along the vertical direction between the first and the second roller bearing beds;

wherein the pluralities of rolling bodies are configured to transfer a displacement force along the displacement direction between the first and the second roller bearing beds; and wherein the pluralities of rolling bodies are configured not to transfer a transverse force along the transverse direction between the first and the second roller bearing beds.

2. The carriage arrangement according to claim 1, wherein the first roller bearing guide has a bearing part with the plurality of rolling bodies arranged thereon and a support surface curved in cross-section, wherein the first roller bearing guide further comprises a support rail which is supported on the support surface, and wherein the forces occurring in the displacement direction can be dissipated via the support rail abutting the bearing part.

3. The carriage arrangement according to claim 2, wherein the support surface in cross-section is in the form of a circular arc being a semicircle.

4. The carriage arrangement according to claim 2, wherein the bearing part is held non-pivotably about its longitudinal axis by a form-fit on the roller part or sash part.

5. The carriage arrangement according to claim 2, wherein the support rail has non-fixed free ends in its longitudinal direction.

6. The carriage arrangement according to claim 5, wherein the support rail is inserted unattached into a recess in the carriage.

7. The carriage arrangement according to claim 1, wherein the first roller bearing guide comprises a ball bearing extending in the longitudinal direction of the first roller bearing guide, wherein the plurality of rolling bodies of the ball bearing are guided in two opposite ball bearing beds which each have a groove that in cross-section is in the form of a circular arc, being a semicircle, wherein the forces occurring in the displacement direction can be passed on via the plurality of rolling bodies and grooves.

8. The carriage arrangement according to claim 1, wherein the first roller bearing guide comprises a needle bearing.

9. The carriage arrangement according to claim 8, wherein the first roller bearing guide has a needle bearing bed on the surface of which the plurality of rolling bodies being needles of the needle bearing are movable, wherein the surface is formed at an angle (w) of more than 0° and less than 180° in relation to the displacement direction in order to pass on the forces occurring in the displacement direction.

10. The carriage arrangement according to claim 1, wherein the carriage arrangement comprises the following:

d) a second roller bearing guide via which the sash part is supported transversely to the main plane on the roller part during the movement in order to offload the weight of the sash onto the roller part;

wherein the second roller bearing guide is spaced apart from the first roller bearing guide in the direction of the longitudinal axis of the roller part, and wherein the sash part is supported on the roller part via the second roller bearing guide in the displacement direction, wherein forces occurring on the sash part in the displacement direction can be introduced into the roller part via the second roller bearing guide.

11. The carriage arrangement according to claim 10, wherein the second roller bearing guide is designed identically to the first roller bearing guide.

12. The carriage arrangement according to claim 1, wherein the roller part is guided on the sash part via a form-fit, being a dovetail-shaped form-fit, wherein the roller part is insertable into the sash part transversely to the main plane for assembling the carriage.

13. The carriage arrangement according to claim 1, wherein the sash part is integrally formed and has a straight guide slot through which the control projection is guided.

14. The carriage arrangement according to claim 1, wherein the driving bar arrangement is fastened to the carriage in a tool-free, non-detachable manner.

15. The window or door comprising the fixed frame and the sash and also the carriage arrangement according to claim 1, wherein by means of the carriage arrangement, the sash can be displaced in the displacement direction parallel to the main plane of the fixed frame and can be shifted transversely to this main plane.

16. A carriage arrangement for displacing a sash of a window or door in a displacement direction that is parallel to a main plane of a fixed frame of the window or door and for shifting the sash transversely to this main plane, wherein the carriage arrangement comprises the following:

a) a driving bar arrangement which can be arranged on the sash and which has a driving bar movable in a groove peripheral direction;

b) a carriage having a sash part which can be fastened to the sash and a roller part which can be shifted transversely to the main plane and has a plurality of rollers for displacement in the displacement direction;

wherein the driving bar arrangement comprises a control projection which is arranged or formed on the driving bar and which is guided in a control slot in the roller part, which control slot is formed at least sectionally obliquely to the main plane, wherein a movement of the driving bar causes the roller part to shift transversely to the main plane;

c) a first roller bearing guide via which the sash part is supported transversely to the main plane on the roller part during the movement in order to offload the weight of the sash onto the roller part;

wherein the sash part is supported on the roller part in the displacement direction via the first roller bearing guide wherein forces occurring on the roller part in the displacement direction can be introduced into the sash part via the first roller bearing guide;

wherein the first roller bearing guide has a bearing part with rolling bodies arranged thereon and a support surface curved in cross-section, wherein the first roller bearing guide further comprises a support rail which is supported on the support surface, and wherein the forces occurring in the displacement direction can be dissipated via the support rail abutting the bearing part; and wherein the bearing part is held non-pivotably about its longitudinal axis by a form-fit on the roller part or sash part.

17. A carriage arrangement for displacing a sash of a window or door in a displacement direction that is parallel to a main plane of a fixed frame of the window or door and for shifting the sash transversely to this main plane, wherein the carriage arrangement comprises the following:

a) a driving bar arrangement which can be arranged on the sash and which has a driving bar movable in a groove peripheral direction;

b) a carriage having a sash part which can be fastened to the sash and a roller part which can be shifted transversely to the main plane and has a plurality of rollers for displacement in the displacement direction;

wherein the driving bar arrangement comprises a control projection which is arranged or formed on the driving bar and which is guided in a control slot in the roller part, which control slot is formed at least sectionally obliquely to the main plane, wherein a movement of the driving bar causes the roller part to shift transversely to the main plane;

c) a first roller bearing guide via which the sash part is supported transversely to the main plane on the roller part during the movement in order to offload the weight of the sash onto the roller part;

wherein the sash part is supported on the roller part in the displacement direction via the first roller bearing guide wherein forces occurring on the roller part in the displacement direction can be introduced into the sash part via the first roller bearing guide;

wherein the first roller bearing guide has a bearing part with rolling bodies arranged thereon and a support surface curved in cross-section, wherein the first roller bearing guide further comprises a support rail which is supported on the support surface, and wherein the forces occurring in the displacement direction can be dissipated via the support rail abutting the bearing part;

wherein the support rail has non-fixed free ends in its longitudinal direction;

wherein the support rail is inserted unattached into a recess in the carriage.

18. A carriage arrangement for displacing a sash of a window or door in a displacement direction that is parallel to a main plane of a fixed frame of the window or door and for shifting the sash transversely to this main plane, wherein the carriage arrangement comprises the following:

a) a driving bar arrangement which can be arranged on the sash and which has a driving bar movable in a groove peripheral direction;

b) a carriage having a sash part which can be fastened to the sash and a roller part which can be shifted transversely to the main plane and has a plurality of rollers for displacement in the displacement direction;

wherein the driving bar arrangement comprises a control projection which is arranged or formed on the driving bar and which is guided in a control slot in the roller part, which control slot is formed at least sectionally obliquely to the main plane, wherein a movement of the driving bar causes the roller part to shift transversely to the main plane;

c) a first roller bearing guide via which the sash part is supported transversely to the main plane on the roller part during the movement in order to offload the weight of the sash onto the roller part;

wherein the sash part is supported on the roller part in the displacement direction via the first roller bearing guide wherein forces occurring on the roller part in the displacement direction can be introduced into the sash part via the first roller bearing guide;

wherein the first roller bearing guide comprises a ball bearing extending in the longitudinal direction of the first roller bearing guide, wherein a plurality of balls of the ball bearing are guided in two opposite ball bearing beds which each have a groove that in cross-section is in the form of a circular arc, being a semicircle, wherein the forces occurring in the displacement direction can be passed on via the plurality of balls and grooves.

19. A carriage arrangement for displacing a sash of a window or door in a displacement direction that is parallel to a main plane of a fixed frame of the window or door and for shifting the sash transversely to this main plane, wherein the carriage arrangement comprises the following:

a) a driving bar arrangement which can be arranged on the sash and which has a driving bar movable in a groove peripheral direction;

b) a carriage having a sash part which can be fastened to the sash and a roller part which can be shifted transversely to the main plane and has a plurality of rollers for displacement in the displacement direction;

wherein the driving bar arrangement comprises a control projection which is arranged or formed on the driving bar and which is guided in a control slot in the roller part, which control slot is formed at least sectionally obliquely to the main plane, wherein a movement of the driving bar causes the roller part to shift transversely to the main plane;

c) a first roller bearing guide via which the sash part is supported transversely to the main plane on the roller part during the movement in order to offload the weight of the sash onto the roller part;

wherein the sash part is supported on the roller part in the displacement direction via the first roller bearing guide wherein forces occurring on the roller part in the displacement direction can be introduced into the sash part via the first roller bearing guide;

wherein the first roller bearing guide comprises a needle bearing;

wherein the first roller bearing guide has a needle bearing bed on the surface of which the needles of the needle bearing are movable, wherein the surface is formed at an angle (w) of more than 0° and less than 180° in relation to the displacement direction in order to pass on the forces occurring in the displacement direction.

* * * * *